(12) United States Patent
Ambrus et al.

(10) Patent No.: US 8,929,612 B2
(45) Date of Patent: *Jan. 6, 2015

(54) SYSTEM FOR RECOGNIZING AN OPEN OR CLOSED HAND

(75) Inventors: Anthony Ambrus, Seattle, WA (US);
Kyungsuk David Lee, Redmond, WA (US); Andrew Campbell, Kirkland, WA (US); David Haley, Bellevue, WA (US); Brian Mount, Seattle, WA (US); Albert Robles, Redmond, WA (US); Daniel Osborn, Redmond, WA (US); Shawn Wright, Sammamish, WA (US); Nahil Sharkasi, Kirkland, WA (US); Dave Hill, Bellevue, WA (US); Daniel McCulloch, Kirkland, WA (US); Alexandru Balan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 438 days.

This patent is subject to a terminal disclaimer.

(21) Appl. No.: 13/299,857

(22) Filed: Nov. 18, 2011

(65) Prior Publication Data
US 2012/0308140 A1 Dec. 6, 2012

Related U.S. Application Data

(60) Provisional application No. 61/493,857, filed on Jun. 6, 2011.

(51) Int. Cl.
*G06K 9/00* (2006.01)
(52) U.S. Cl.
CPC ........ *G06K 9/00375* (2013.01); *G06K 9/00362* (2013.01)

USPC .......................................... 382/115
(58) Field of Classification Search
CPC .................. G06K 9/00375; G06K 9/00362
USPC .......................... 382/115, 116, 124, 125, 126
See application file for complete search history.

(56) References Cited

U.S. PATENT DOCUMENTS

| 4,627,620 A | 12/1986 | Yang |
| 4,630,910 A | 12/1986 | Ross et al. |

(Continued)

FOREIGN PATENT DOCUMENTS

| CN | 101254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Brian Le
(74) *Attorney, Agent, or Firm* — Aaron Chatterjee; Kate Drakos; Micky Minhas

(57) ABSTRACT

A system and method are disclosed relating to a pipeline for generating a computer model of a target user, including a hand model of the user's hands, captured by an image sensor in a NUI system. The computer model represents a best estimate of the position of a user's hand or hands and whether the hand or hand is in an open or closed state. The generated hand model may be used by a gaming or other application to determine such things as user gestures and control actions.

17 Claims, 21 Drawing Sheets

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |

(56) References Cited

U.S. PATENT DOCUMENTS

| | | | |
|---|---|---|---|
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,821,541 B2 | 10/2010 | Delean | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,428,311 B2 * | 4/2013 | Dariush et al. | 382/115 |
| 2007/0124694 A1 | 5/2007 | Van De Sluis et al. | |
| 2008/0026838 A1 | 1/2008 | Dunstan et al. | |
| 2008/0212836 A1 | 9/2008 | Fujimura et al. | |
| 2008/0225041 A1 | 9/2008 | El Dokor et al. | |
| 2008/0244465 A1 | 10/2008 | Kongqiao et al. | |
| 2009/0033623 A1 | 2/2009 | Lin | |
| 2009/0103780 A1 | 4/2009 | Nishihara et al. | |
| 2011/0025689 A1 | 2/2011 | Perez et al. | |
| 2011/0102570 A1 | 5/2011 | Wilf et al. | |
| 2012/0069168 A1 * | 3/2012 | Huang et al. | 348/77 |
| 2012/0155705 A1 * | 6/2012 | Latta et al. | 382/103 |
| 2012/0163723 A1 * | 6/2012 | Balan et al. | 382/224 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Khandelwal, Sourav. "Articulated Hand Posture Recognition System using IDSC Features." Technical Paper for CS 676: Computer Vision and Image Processing. Indian Institute of Technology. Apr. 19, 2011, Kanpur, India. 7 pages.

Nowlan, Steven J. and John C. Platt. "A Convolutional Neural Network Hand Tracker." Proceedings of the 1995 Conference on Neural Information Processing Systems (NIPS). Nov. 1995, Denver, CO., USA. 8 pages.

Ramamoorthy et al. "Recognition of dynamic hand gestures." Pattern Recognition—The Journal of the Pattern Recognition Society. Dec. 2000, vol. 36, pp. 2069-2081. Elsevier Science Ltd, New York, NY, USA.

International Search Report and Written Opinion dated Dec. 28, 2012 in International Patent Application No. PCT/US2012/040788.

* cited by examiner

Pixel Classifier
Results

- Finger tip + direction
- Finger phalange + direction
- Larger groups (2/4 fingers)
  - Run classifier again with larger boundary radius
- Finger base
- Palm

SYSTEM FOR RECOGNIZING AN OPEN OR CLOSED HAND

CLAIM OF PRIORITY

The present application claims priority to U.S. Provisional Patent Application No. 61/493,857, entitled "System for Recognizing an Open or Closed Hand," filed Jun. 6, 2011, which application is incorporated by reference herein in its entirety.

BACKGROUND

In the past, computing applications such as computer games and multimedia applications used controllers, remotes, keyboards, mice, or the like to allow users to manipulate game characters or other aspects of an application. More recently, computer games and multimedia applications have begun employing cameras and software gesture recognition engines to provide a natural user interface ("NUI"). With NUI, raw joint data and user gestures are detected, interpreted and used to control game characters or other aspects of an application.

One of the challenges of a NUI system is distinguishing a person in the field of view of an image sensor, and correctly identifying the positions of his or her body parts including hands and fingers within the field of view. Routines are known for tracking arms, legs, heads and torso. However, given the subtle detail and wide variety of positions of a user's hands, conventional systems are not able to satisfactorily recognize and track a user's body including finger and hand positions. Detecting whether a user's hand is open or closed can be used in a wide variety of control and/or application metrics. It would be useful to have a system capable of reliably detecting the open or closed state of the user's hand(s).

SUMMARY

Disclosed herein are systems and methods for recognizing and tracking a user's skeletal joints, including hand and finger positions and whether a hand is open or closed, with a NUI system. In examples, the tracking of hand and finger positions may be used by NUI systems for triggering events such as selecting, engaging, or grabbing and dragging objects on a screen. A variety of other gestures, control actions and applications may be enabled by the present technology for recognizing and tracking hand and finger positions and motions. By determining an open or closed state of a user's hand, interactivity of a user with a NUI or other system may be increased, and simpler and more intuitive interfaces may be presented to a user.

In one example, the present disclosure relates to a method for generating a model of a user's hand including one or more fingers, comprising: (a) receiving position data representing a position of a user interacting with a sensor, the position data including at least one of depth and image data representing the user's hand; and (b) analyzing the position data to identify whether a hand is in an open or closed state, said step (b) including the steps of: (b)(1) analyzing depth data from the position data captured in said step (a) to segment the position data into data of the hand, and (b)(2) extracting a set of feature descriptors by applying one or more filters to the image data of the hand identified in said step (b)(1), the one or more filters analyzing image data of the hand as compared to image data outside of a boundary of the hand to discern features of the hand including a shape of the hand.

In a further example, the present disclosure relates to a system for determining whether a detected hand is open or closed, the system including a sensing mechanism operatively coupled to a computing device, the system comprising: a skeletal recognition engine for recognizing at least a portion of a skeleton of a user from received data including at least one of image and depth data; an image segmentation engine for segmenting one or more regions of the body into a region representing a hand of the user; and a descriptor extraction engine for extracting data representative of a hand including one or more fingers and whether the hand is open or closed, the descriptor extraction engine applying a plurality of filters for analyzing pixels in the region representing the hand, each filter in the plurality of filters determining a position and open or closed state of the hand, the descriptor extraction engine combining the results of each filter to arrive at a best estimate of whether the hand is opened or closed.

In another example, the present disclosure relates to a computer-readable storage medium not consisting of a modulated data signal, the computer-readable storage medium having computer-executable instructions for programming a processor to perform a method for generating a model of a user's hand including one or more fingers for a natural user interface, the method comprising: (a) receiving image data of a user interacting with the natural user interface; (b) analyzing the image data to identify the hand in the image data; and (c) comparing the image data of the identified hand against predefined hand positions to determine if the user has performed one of the following predefined hand gestures or control actions: (c)(1) a grab gesture; (c)(2) a release gesture; (c)(3) a pulling gesture where the hand is determined to close around a virtual object and actuate the virtual object; (c)(4) initiate and persist an action by identifying an open hand; and (c)(5) terminate an action by identifying a closed hand.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Embodiments of the present technology will now be described with reference to FIGS. 1A-21B which in general relate to a pipeline for generating a computer model of a target user, including a hand model of the user's hands and/or fingers, captured by an image sensor in a NUI system. The computer model may be generated once per frame of captured image data, and represents a best estimate of the position, including pose, of a user during the captured frame. The generated hand model for each frame may be used by a gaming or other application to determine such things as user gestures and control actions. The hand model may also be fed back into the pipeline to aid in future model determinations.

Figure 1A:
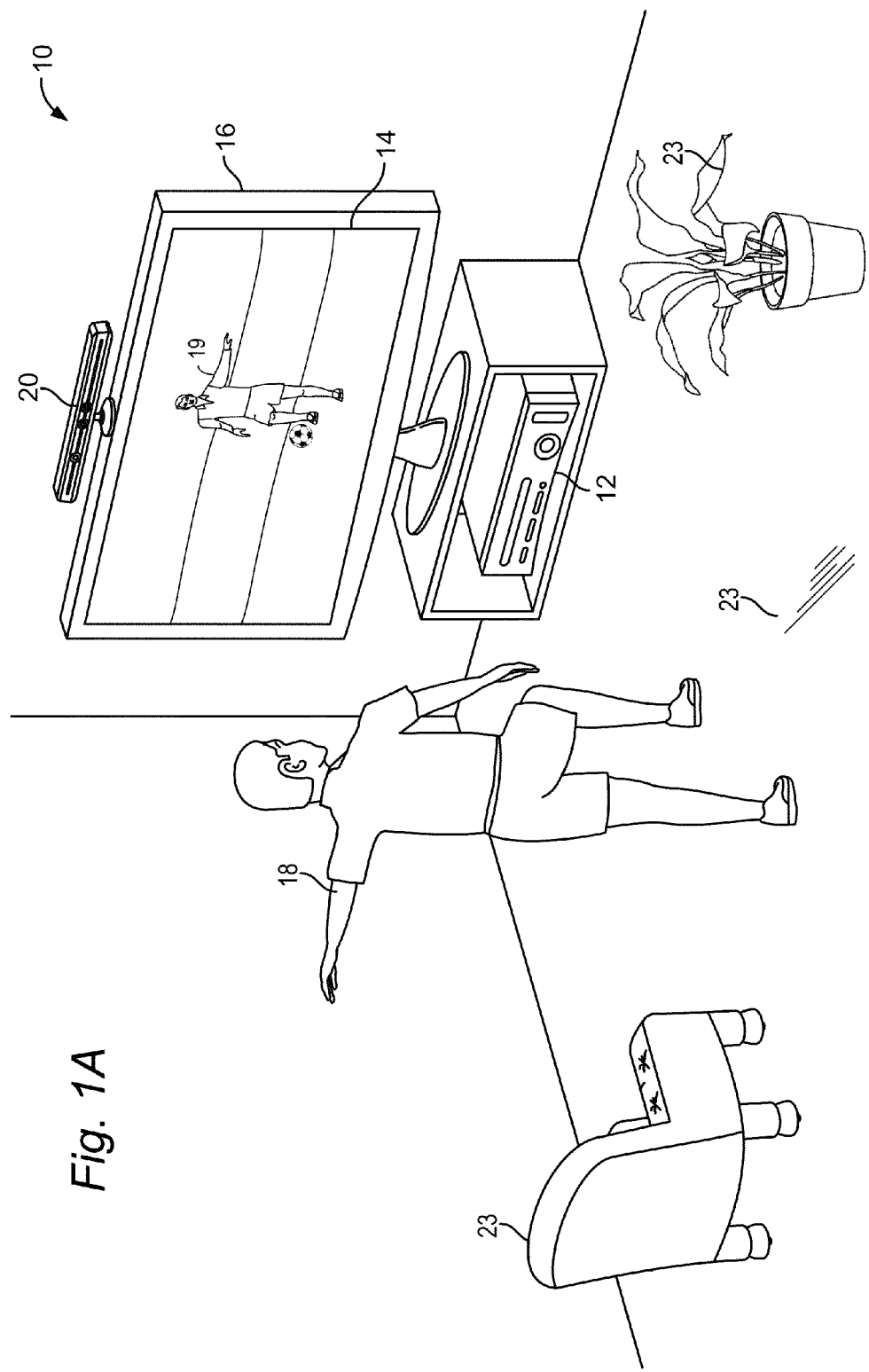
FIG. 1A illustrates an example embodiment of a target recognition, analysis, and tracking system.
Figure 1B:
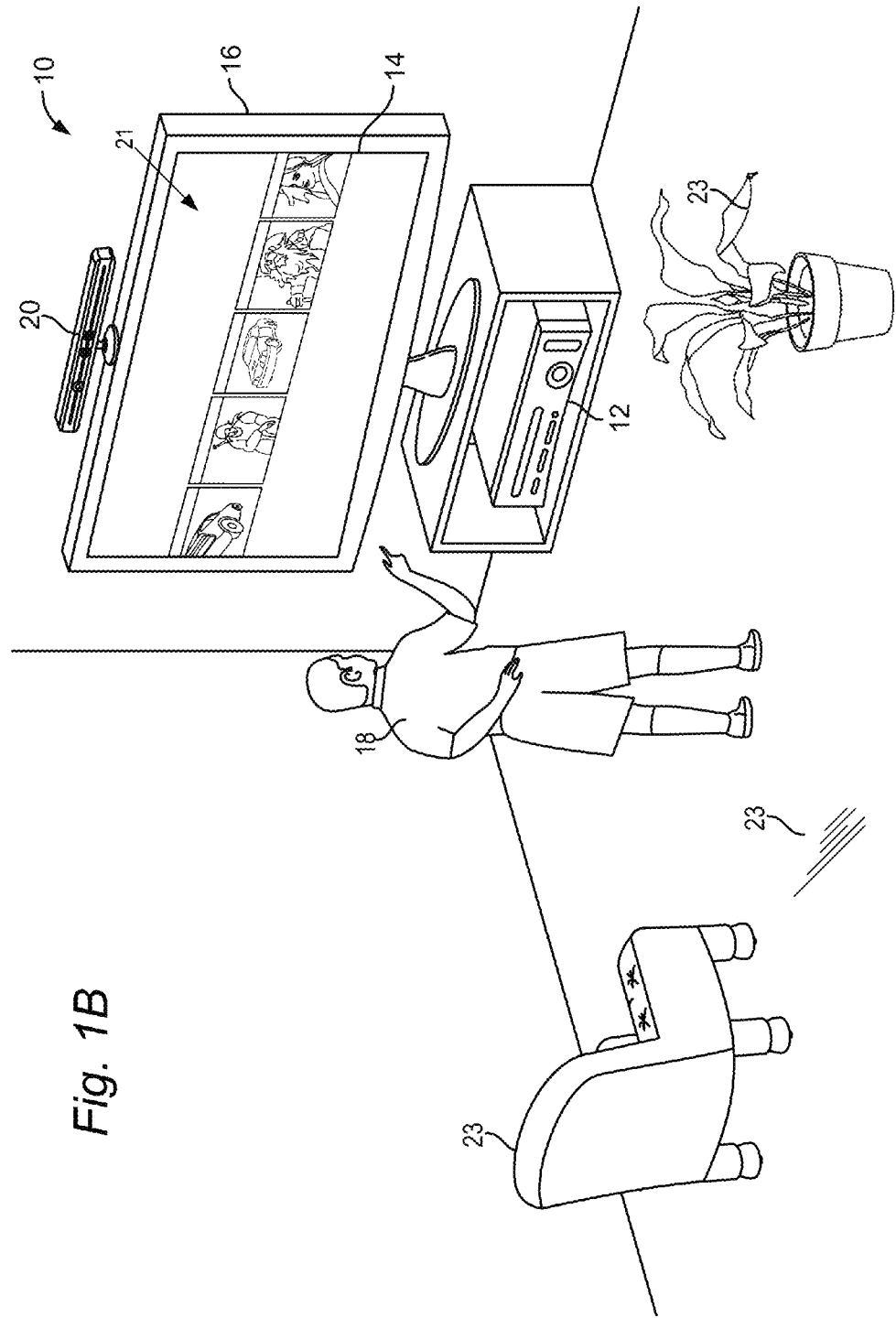
FIG. 1B illustrates a further example embodiment of a target recognition, analysis, and tracking system.
Figure 1C:
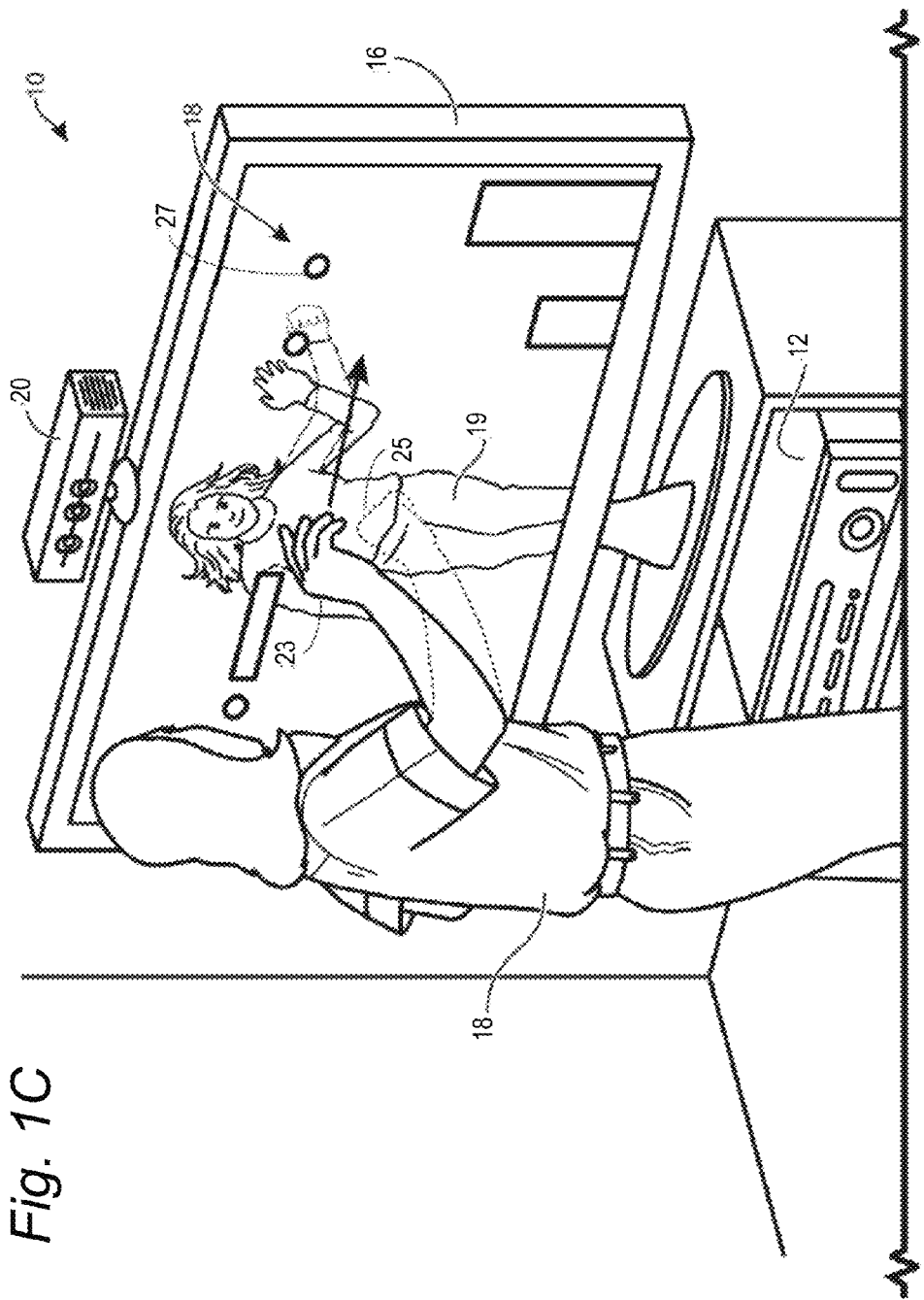
FIG. 1C illustrates a still further example embodiment of a target recognition, analysis, and tracking system.
Figure 2:
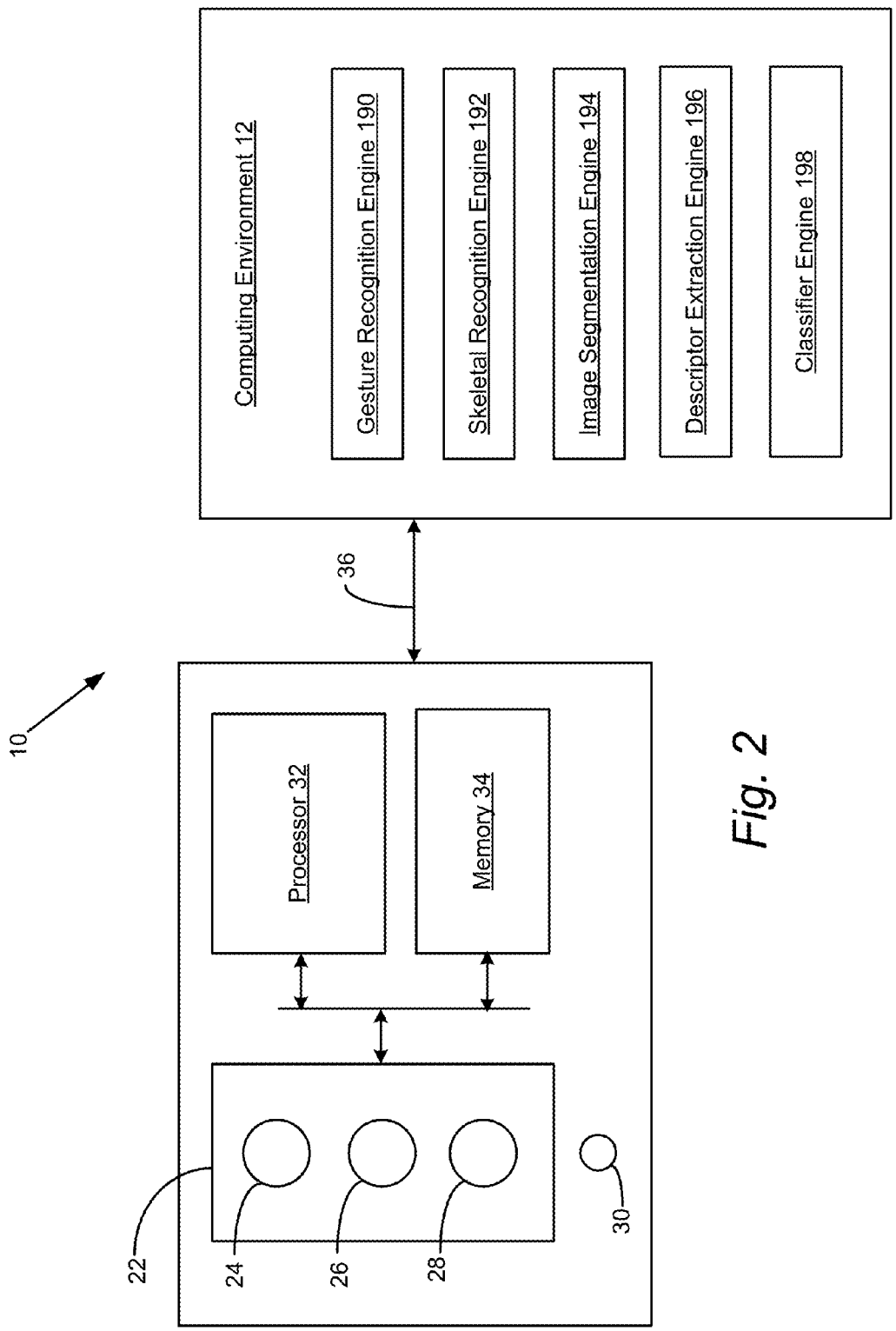
FIG. 2 illustrates an example embodiment of a capture device that may be used in a target recognition, analysis, and tracking system.

Referring initially to FIGS. 1A-2, the hardware for implementing the present technology includes a target recognition, analysis, and tracking system 10 which may be used to recognize, analyze, and/or track a human target such as the user 18. Embodiments of the target recognition, analysis, and tracking system 10 include a computing environment 12 for executing a gaming or other application. The computing environment 12 may include hardware components and/or software components such that computing environment 12 may be used to execute applications such as gaming and non-gaming applications. In one embodiment, computing environment 12 may include a processor such as a standardized processor, a specialized processor, a microprocessor, or the like that may execute instructions stored on a processor readable storage device for performing processes described herein.

The system 10 further includes a capture device 20 for capturing image and audio data relating to one or more users and/or objects sensed by the capture device. In embodiments, the capture device 20 may be used to capture information relating to body and hand movements and/or gestures and speech of one or more users, which information is received by the computing environment and used to render, interact with and/or control aspects of a gaming or other application. Examples of the computing environment 12 and capture device 20 are explained in greater detail below.

Embodiments of the target recognition, analysis and tracking system 10 may be connected to an audio/visual (A/V) device 16 having a display 14. The device 16 may for example be a television, a phone, a monitor for a computer, a high-definition television (HDTV), or the like that may provide game or application visuals and/or audio to a user. For example, the computing environment 12 may include a video adapter such as a graphics card and/or an audio adapter such as a sound card that may provide audio/visual signals associated with the game or other application. The A/V device 16 may receive the audio/visual signals from the computing environment 12 and may then output the game or application visuals and/or audio associated with the audio/visual signals to the user 18. According to one embodiment, the audio/visual device 16 may be connected to the computing environment 12 via, for example, an S-Video cable, a coaxial cable, an HDMI cable, a DVI cable, a VGA cable, a component video cable, or the like.

In embodiments, the computing environment 12, the A/V device 16 and the capture device 20 may cooperate to render an avatar or on-screen character 19 on display 14. For example, FIG. 1A shows a user 18 playing a soccer gaming application. The user's movements are tracked and used to animate the movements of the avatar 19. In embodiments, the avatar 19 mimics the movements of the user 18 in real world space so that the user 18 may perform movements and gestures which control the movements and actions of the avatar 19 on the display 14.

As explained above, motion estimation routines such as skeleton mapping systems may lack the ability to detect subtle gestures of a user, such as for example the movement of a user's hand. For example, a user may wish to interact with NUI system 10 by scrolling through and controlling a user interface 21 with his hand as shown in FIG. 1B. A user may alternatively attempt to perform various gestures, such as for example by opening and/or closing her hand as shown as 23 and 25 in FIG. 1C.

Accordingly, systems and methods, described below herein, are directed to determining a state of a hand of a user. For example, the action of closing and opening the hand may be used by such systems for triggering events such as selecting, engaging, or grabbing and dragging objects, e.g., object 27 (FIG. 1C), on the screen. These actions otherwise would correspond to pressing a button when using a controller. Such refined controller-free interaction can be used as an alternative to approaches based on hand waving or hovering, which may be unintuitive or cumbersome. A variety of other gestures, control actions and applications may be enabled by the present technology for recognizing and tracking hand motions, some of which are described in further detail below. By determining states of a user's hand as described below, interactivity of a user with the system may be increased and simpler and more intuitive interfaces may be presented to a user.

FIGS. 1A-1B include static, background objects 23, such as a floor, chair and plant. These are objects within the field of view (FOV) captured by capture device 20, but do not change from frame to frame. In addition to the floor, chair and plant shown, static objects may be any objects picked up by the image cameras in capture device 20. The additional static objects within the scene may include any walls, ceiling, windows, doors, wall decorations, etc.

Suitable examples of a system 10 and components thereof are found in the following co-pending patent applications, all of which are hereby specifically incorporated by reference: U.S. patent application Ser. No. 12/475,094, entitled "Environment and/or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; and U.S. patent application Ser. No. 12/391,150, entitled "Standard Gestures," filed Feb. 23, 2009.

FIG. 2 illustrates an example embodiment of the capture device 20 that may be used in the target recognition, analysis, and tracking system 10. In an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight. X and Y axes may be defined as being perpendicular to the Z axis. The Y axis may be vertical and the X axis may be horizontal. Together, the X, Y and Z axes define the 3-D real world space captured by capture device 20.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as a grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 20 to a particular location on the targets or objects.

According to another embodiment, the capture device 20 may include two or more physically separated cameras that may view a scene from different angles, to obtain visual stereo data that may be resolved to generate depth information. In another example embodiment, the capture device 20 may use point cloud data and target digitization techniques to detect features of the user. Other sensor systems may be used in further embodiments, such as for example an ultrasonic system capable of detecting x, y and z axes.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image camera component 22 and the processor 32. According to another embodiment, the memory component 34 may be integrated into the processor 32 and/or the image camera component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28. With the aid of these devices, a partial skeletal model may be developed in accordance with the present technology, with the resulting data provided to the computing environment 12 via the communication link 36.

The computing environment 12 may further include a gesture recognition engine 190 for recognizing gestures as explained below. In accordance with the present system, the computing environment 12 may further include a skeletal recognition engine 192, an image segmentation engine 194, a descriptor extraction engine 196 and a classifier engine 198. Each of these software engines is described in greater detail below.

Figure 3:
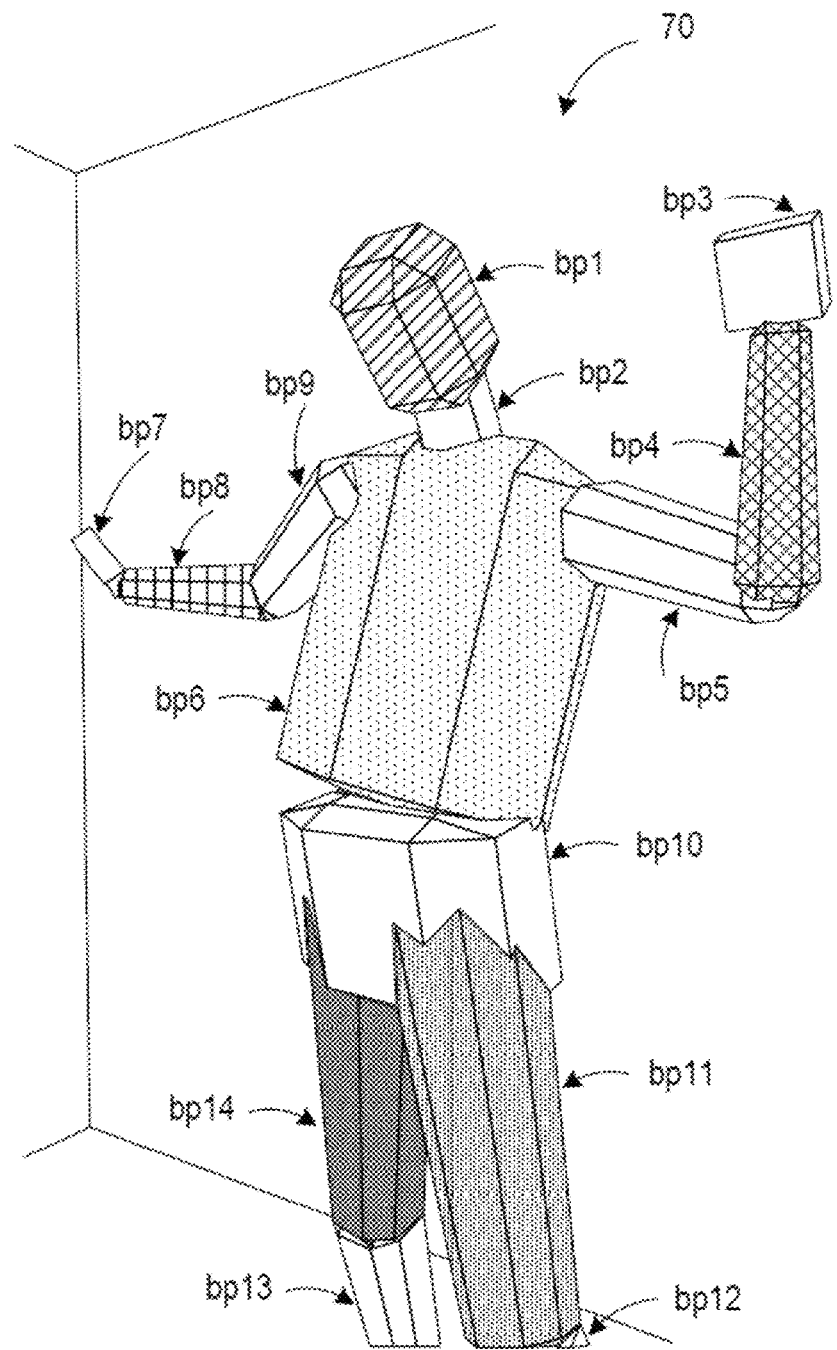
FIG. 3 shows an exemplary body model used to represent a human target.

FIG. 3 shows a non-limiting visual representation of an example body model 70 generated by skeletal recognition engine 192. Body model 70 is a machine representation of a modeled target (e.g., user 18 from FIGS. 1A and 1B). The body model may include one or more data structures that include a set of variables that collectively define the modeled target in the language of a game or other application/operating system.

A model of a target can be variously configured without departing from the scope of this disclosure. In some examples, a model may include one or more data structures that represent a target as a three-dimensional model including rigid and/or deformable shapes, or body parts. Each body part may be characterized as a mathematical primitive, examples of which include, but are not limited to, spheres, anisotropically-scaled spheres, cylinders, anisotropic cylinders, smooth cylinders, boxes, beveled boxes, prisms, and the like.

For example, body model 70 of FIG. 3 includes body parts bp1 through bp14, each of which represents a different portion of the modeled target. Each body part is a three-dimensional shape. For example, bp3 is a rectangular prism that represents the left hand of a modeled target, and bp5 is an octagonal prism that represents the left upper-arm of the modeled target. Body model 70 is exemplary in that a body model may contain any number of body parts, each of which may be any machine-understandable representation of the corresponding part of the modeled target.

A model including two or more body parts may also include one or more joints. Each joint may allow one or more body parts to move relative to one or more other body parts. For example, a model representing a human target may include a plurality of rigid and/or deformable body parts, wherein some body parts may represent a corresponding anatomical body part of the human target. Further, each body part of the model may include one or more structural members (i.e., "bones" or skeletal parts), with joints located at the intersection of adjacent bones. It is to be understood that some bones may correspond to anatomical bones in a human target and/or some bones may not have corresponding anatomical bones in the human target.

Figure 5:
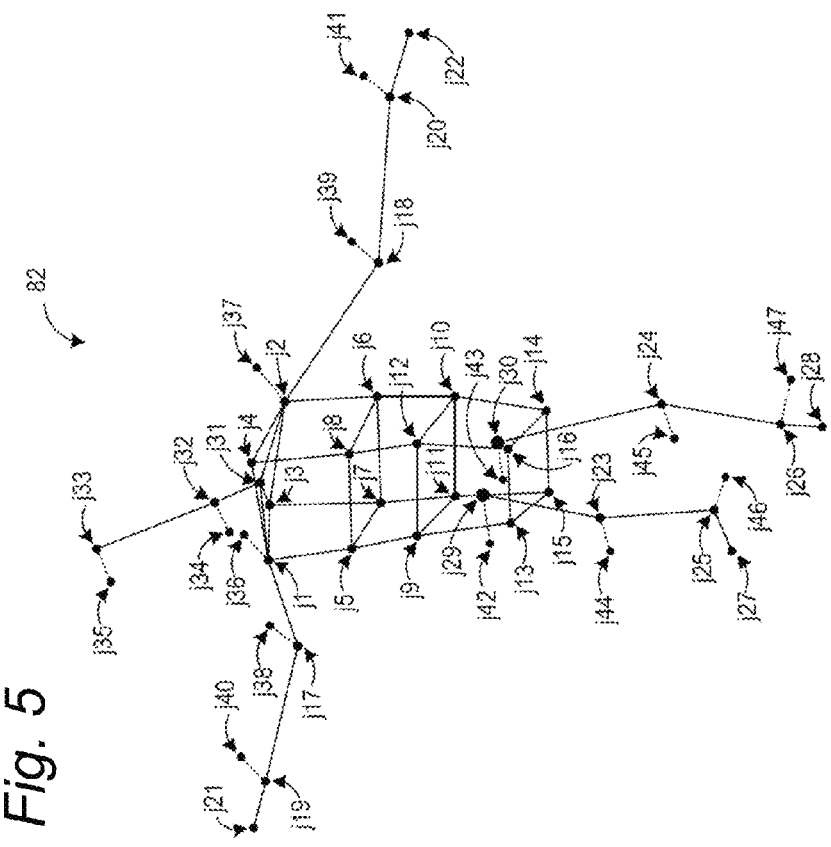
FIG. 5 shows a skewed view of an exemplary skeletal model used to represent a human target.
Figure 4:
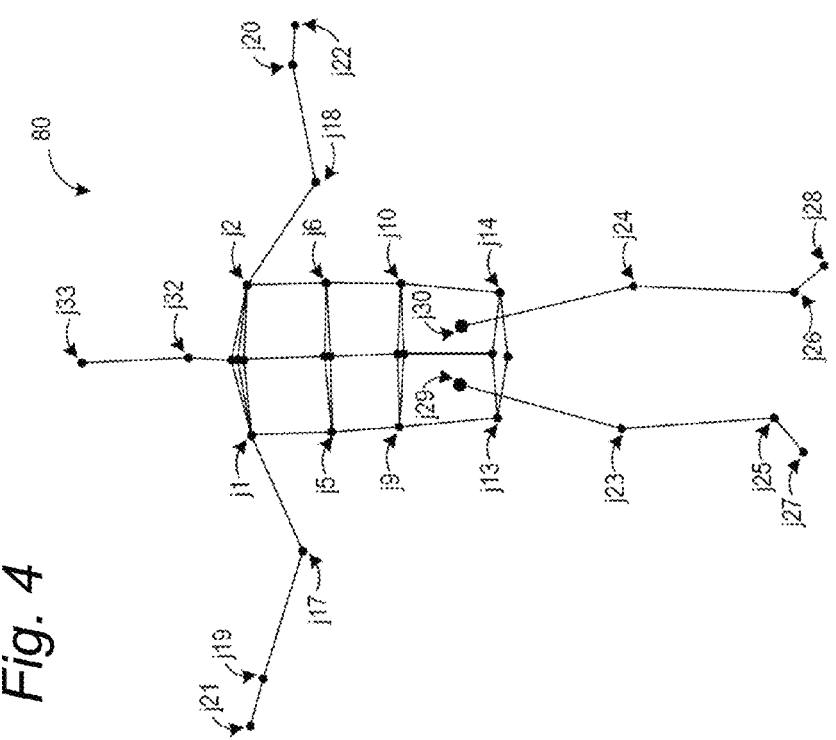
FIG. 4 shows a substantially frontal view of an exemplary skeletal model used to represent a human target.

The bones and joints may collectively make up a skeletal model, which may be a constituent element of the body model. In some embodiments, a skeletal model may be used instead of another type of model, such as model 70 of FIG. 3. The skeletal model may include one or more skeletal members for each body part and a joint between adjacent skeletal members. Exemplary skeletal model 80 and exemplary skeletal model 82 are shown in FIGS. 4 and 5, respectively. FIG. 4 shows a skeletal model 80 as viewed from the front, with joints j1 through j33. FIG. 5 shows a skeletal model 82 as viewed from a skewed view, also with joints j1 through j33. A skeletal model may include more or fewer joints without departing from the spirit of this disclosure. Further embodiments of the present system explained hereinafter operate using a skeletal model having 31 joints.

The above described body part models and skeletal models are non-limiting examples of types of models that may be used as machine representations of a modeled target. Other models are also within the scope of this disclosure. For example, some models may include polygonal meshes, patches, non-uniform rational B-splines, subdivision surfaces, or other high-order surfaces. A model may also include surface textures and/or other information to more accurately represent clothing, hair, and/or other aspects of a modeled target. A model may optionally include information pertaining to a current pose, one or more past poses, and/or model physics. It is to be understood that a variety of different models that can be posed are compatible with the herein described target recognition, analysis, and tracking system.

Software pipelines for generating skeletal models of one or more users within a FOV of capture device 20 are known. One such system is disclosed for example in U.S. patent application Ser. No. 12/876,418, entitled "System For Fast, Probabilistic Skeletal Tracking," filed Sep. 7, 2010, which application is incorporated by reference herein in its entirety. Under certain conditions, for example where a user is sufficiently close to capture device 20 and at least one of the user's hands is distinguishable from other background noise, a software pipeline may further be able to generate hand models for the hand and/or fingers of one or more users within the FOV.

Figure 6:
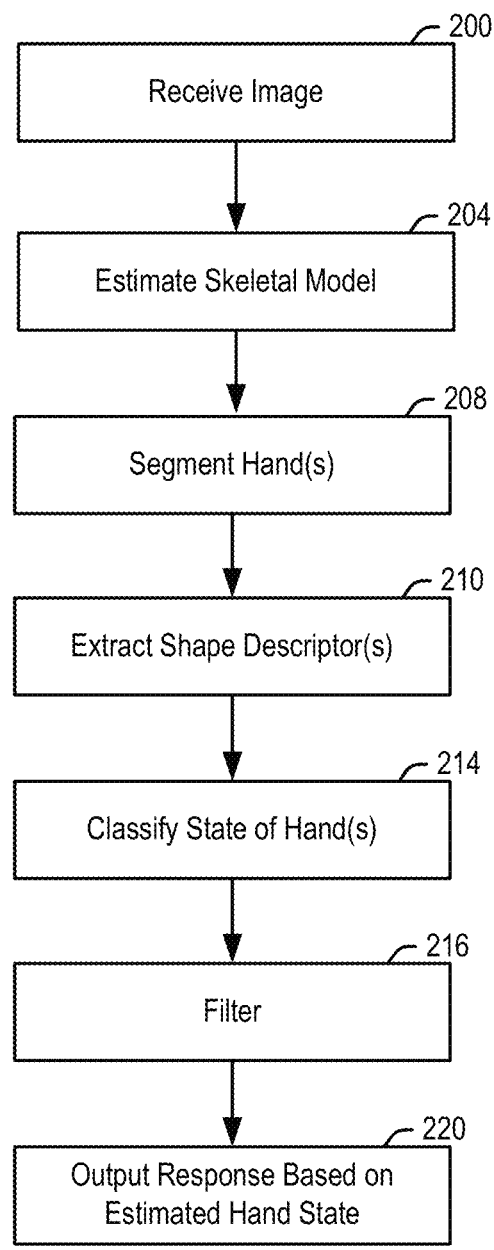
FIG. 6 shows a flowchart of a pipeline for tracking a target according to an embodiment of the present technology.
Figure 7:
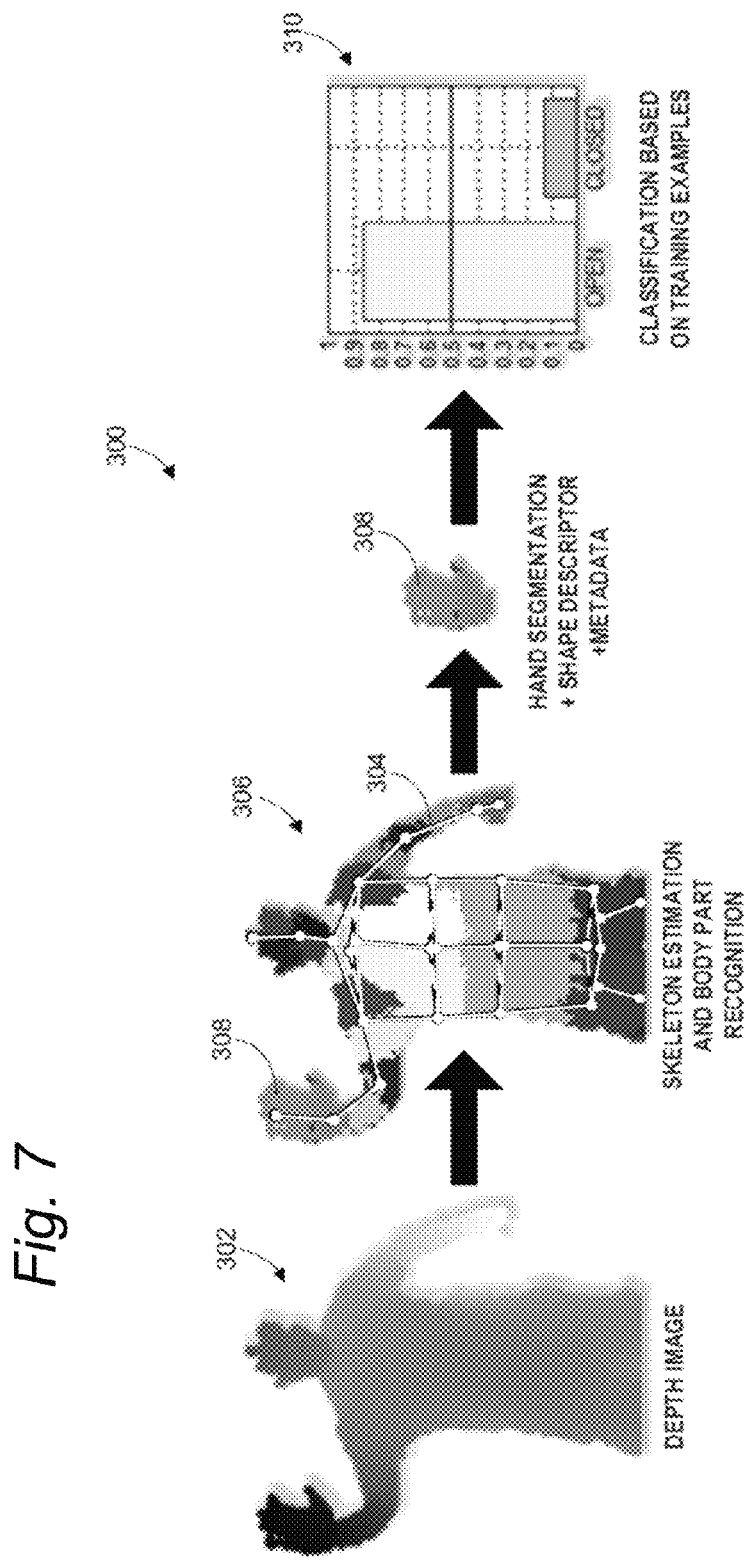
FIG. 7 illustrates an example method of determining a state of a hand of a user in accordance with an embodiment of the present disclosure.

FIG. 6 is a flowchart of a software pipeline for recognizing and tracking a user's hand and/or fingers. In step 200, the pipeline receives a depth image from capture device 20. A depth image of a portion of a user is illustrated in FIG. 7 at 302. Each pixel in the depth image includes depth information, e.g., as illustrated in FIG. 7 by a gray-scale gradient. For example, at 302, the left hand of the user is closer to the capture device 20, as indicated by the darker region of the left hand. The capture device or depth camera captures images of a user within an observed scene. As described below, a depth image of a user may be used to determine distance information of the regions of the user, scale information of the user, curvature, and skeletal information of the user.

In step 204, the skeletal recognition engine 192 of the pipeline estimates a skeleton model of the user as described above to obtain a virtual skeleton from a depth image obtained in step 200. For example, in FIG. 7, a virtual skeleton 304 is shown as estimated from the depth image shown at 302 of the user.

In step 208, the pipeline segments a hand or hands of the user via the image segmentation engine 194 of the pipeline. In some examples, image segmentation engine 194 may additionally segment one or more regions of the body in addition to the hands. Segmenting a hand of a user includes identifying a region of the depth image corresponding to the hand, where the identifying is at least partially based on the skeleton information obtained in step 204. FIG. 7 illustrates an example of segmentation of the depth image of a user into different regions 306 based on estimated skeleton 304, as indicated by the differently shaded regions. FIG. 7 shows localized hand region 308 corresponding to the user's raised right hand.

Hands or body regions may be segmented or localized in a variety of ways and may be based on selected joints identified in the skeleton estimation described above. As one example, hand detection and localization in the depth image may be based on the estimated wrist and/or hand tip joints from the estimated skeleton. For example, in some embodiments, hand segmentation in the depth image may be performed using a topographical search of the depth image around the hand joints, locating nearby local extrema in the depth image as candidates for finger tips. The image segmentation engine 194 then segments the rest of the hand by taking into account a body size scaling factor as determined from the estimated skeleton, as well as depth discontinuities for boundary identification.

As another example, a flood-fill approach may be employed to identify regions of the depth image corresponding to a user's hands. In a flood-fill approach, the depth image may be searched from a starting point and a starting direction, e.g., the starting point may be the wrist joint and the starting direction may be a direction from the elbow to the wrist joint. Nearby pixels in the depth image may be iteratively scored based on the projection on the starting direction as a way for giving preference to points moving away from the elbow and toward the hand tip, while depth consistency constraints such as depth discontinuities may be used to identify boundaries or extreme values of a user's hands in the depth image. In some examples, threshold distance values may be used to limit the depth map search in both the positive and negative directions of the starting direction based on fixed values or scaled based on an estimated size of the user, for example.

As still another example, a bounding sphere or other suitable bounding shape, positioned based on skeleton joints (e.g. wrist or hand tip joints), may be used to include all pixels in the depth image up to a depth discontinuity. For example, a window may be slid over the bounding sphere to identify depth discontinuities which may be used to establish a boundary in the hand region of the depth image.

The bounding shape method may also be used to place a bounding shape around a center of the palm of the hand which may be iteratively identified. One example of such a iterative bounding method is disclosed in a presentation by David Tuft, titled "Kinect Developer Summit at GDC 2011: Kinect for XBOX 360," attached hereto as Attachment 1, and in a publication by K. Abe, H. Saito, S. Ozawa, titled "3D drawing system via hand motion recognition from cameras", IEEE International Conference on Systems, Man, and Cybernetics, vol. 2, 2000, which publication is incorporated by reference herein in its entirety.

Figure 8:
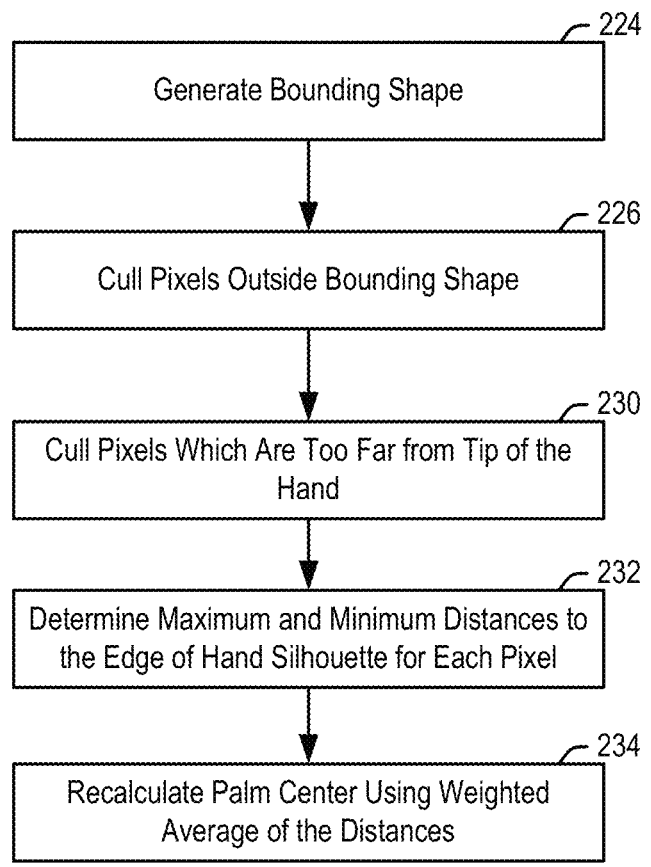
FIG. 8 is a flowchart of the operation of an image segmentation engine according to an embodiment of the present disclosure.

In general, such a method involves several iterative passes to cull pixels from the model. In each pass, the method culls pixels outside the sphere or other shape centered at the hand. Next, the method culls pixels too far from the tip of the hand (along the arm vector). Then the method performs an edge detection step to edge detect hand boundary and remove unconnected islands. Example steps from such a method are shown in the flowchart of FIG. 8. In step 224, a bounding shape is generated around a center of the hand given by the hand joint data from the skeletal recognition engine 192. The bounding shape is large enough to encompass the entire hand and is three-dimensional. In step 226, the pixels outside the bounding shape are culled.

It may happen that a user's hand is close to his or her body, or to the user's second hand, in the depth image, and the data from those other body portions will initially be included in the segmented image. Connected component labeling may be performed to label different centroids in the segmented image. The centroid, which is most likely the hand, is selected, based on its size and the location of the hand joint. The centroids not selected may be culled. In step 230, pixels which are too far from the tip of the hand along a vector from the attached arm may also be culled.

The skeletal data from the skeletal recognition engine 192 may be noisy, so the data for the hand is further refined to identify the center of the hand. This may be done by iterating over the image and measuring the distance of each pixel to the edge of the silhouette of the hand. The image segmentation engine 194 may then perform a weighted average to figure out the maximum/minimum distance. That is, in step 232, for each pixel in the segmented hand image, a maximum distance along the x and y axes to an edge of the hand silhouette is identified, and a minimum distance along the x and y axes to an edge of the hand silhouette is identified. The distance to the edge is taken as a weight, and a weighted average of the minimum determined distances is then taken across all measured pixels to figure out the likely center of the hand position within the image (step 234). Using the new center, the process may be iteratively repeated until the change in the palm center from the previous iteration is within some tolerance.

In some approaches, segmenting of hand regions may be performed when a user raises the hand outward or above or in front of the torso. In this way, identification of hand regions in the depth image may be less ambiguous since the hand regions may be distinguished from the body more easily. Hand images are particularly clear when a user's hand is oriented palm toward the capture device 20, at which point, the features of that hand can be detected as a silhouette. Features may be noisy, but a silhouetted hand allows some informed decisions about what a hand is doing, based on for example detecting gaps between fingers and seeing the overall shape of the hand and mapping that using a variety of different approaches. Detecting those gaps and other features allows recognition of particular fingers, and a general direction of where that finger is pointing.

It should be understood that the example hand segmentation examples described above are presented for the purpose of example and are not intended to limit the scope of this disclosure. In general, any hand or body part segmentation method may be used alone or in combination with each other and/or one of the example methods described above.

Continuing with the pipeline of FIG. 7, step 210 involves extracting a shape descriptor for the region, e.g., the region of the depth image corresponding to a hand as identified in step 208. The shape descriptor in step 210 is extracted by the descriptor extraction engine 196, and may be any suitable representation of the hand region which is used to classify the hand region. In some embodiments, the shape descriptor may be a vector or a set of numbers used to codify or describe the shape of the hand region.

The descriptor extraction engine 196 may use any of a variety of filters in step 210 to extract a shape descriptor. One filter may be referred to as a pixel classifier, which will now be described with reference to the flowchart of FIG. 9, the decision tree of FIG. 10 and the illustrations of FIGS. 11-14. In step 240, a pixel in the foreground of the segmented image is selected. These are the pixels at least nominally believed to be part of the user's hand. A box of predefined size is taken around the selected pixel, with the selected pixel at the center. In embodiments, the size of the box may be selected to be 1.5 times the width of a normalized finger. A "normalized finger" is the finger of the user which has been adjusted to a normalized size based on the size of the skeletal model and a detected distance of the user from the capture device 20. The following steps are run successively for each pixel nominally believed to be part of the hand.

Figure 11A:
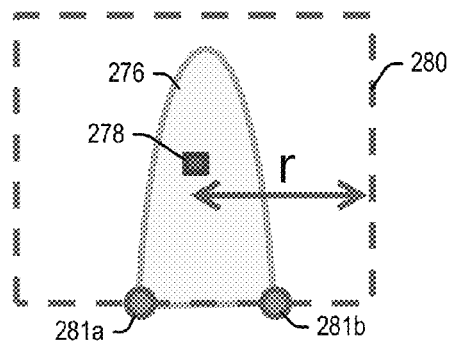
FIGS. 11A and 11B illustrate fingertip identification using a pixel classification filter according to an embodiment of the present disclosure.

In step 242, the pixel classifier filter determines how many edges of the box are intersected. An intersection is where the image transitions from a foreground (on the hand) to a background (not on the hand). For example, FIG. 11A shows a finger 276, a selected pixel 278 on the finger, and the above-described box 280 around the pixel at a radius r. The box is intersected at two points along a single edge; at points 281*a* and 281*b*. The points 281*a*, 281*b* are where the image transitions from the foreground (finger) to the background. All pixels 278 having two intersection points with edges of their respective boxes 280 are considered finger tips (or part of the knuckle or arm as explained below) for the purposes of defining hand centroids as explained below.

Figure 11B:
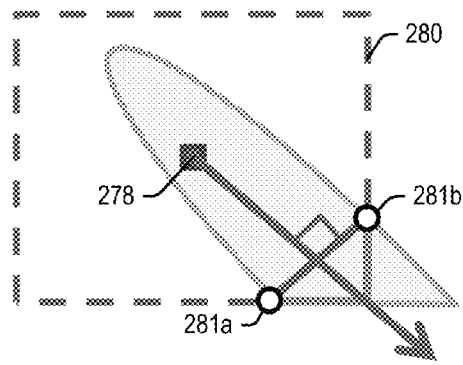

In step 246, the pixel classifier filter determines whether the intersections are in the same or different edges. As seen in FIG. 11B, a finger may intersect the box 280 along two adjacent edges instead of along the same edge. This information will be used to determine the direction at which the finger is pointed as explained below.

Figure 12:
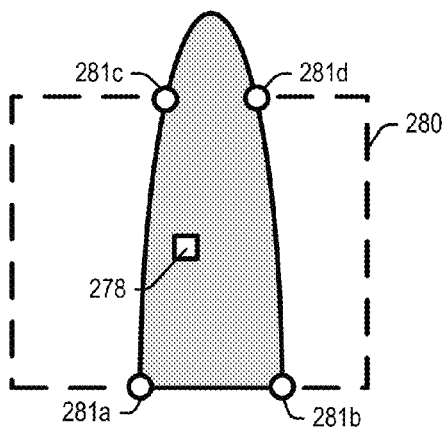
FIG. 12 illustrates finger identification using a pixel classification filter according to an embodiment of the present disclosure.

As opposed to a fingertip, a pixel which intersects its box 280 at four points will be considered a finger for the purposes of defining hand centroids as explained below. For example, FIG. 12 shows an example where the selected pixel 278 is sufficiently distal from the fingertip, that there are four intersection points 281*a*, 281*b*, 281*c* and 281*d* with the box 280.

Figure 9:
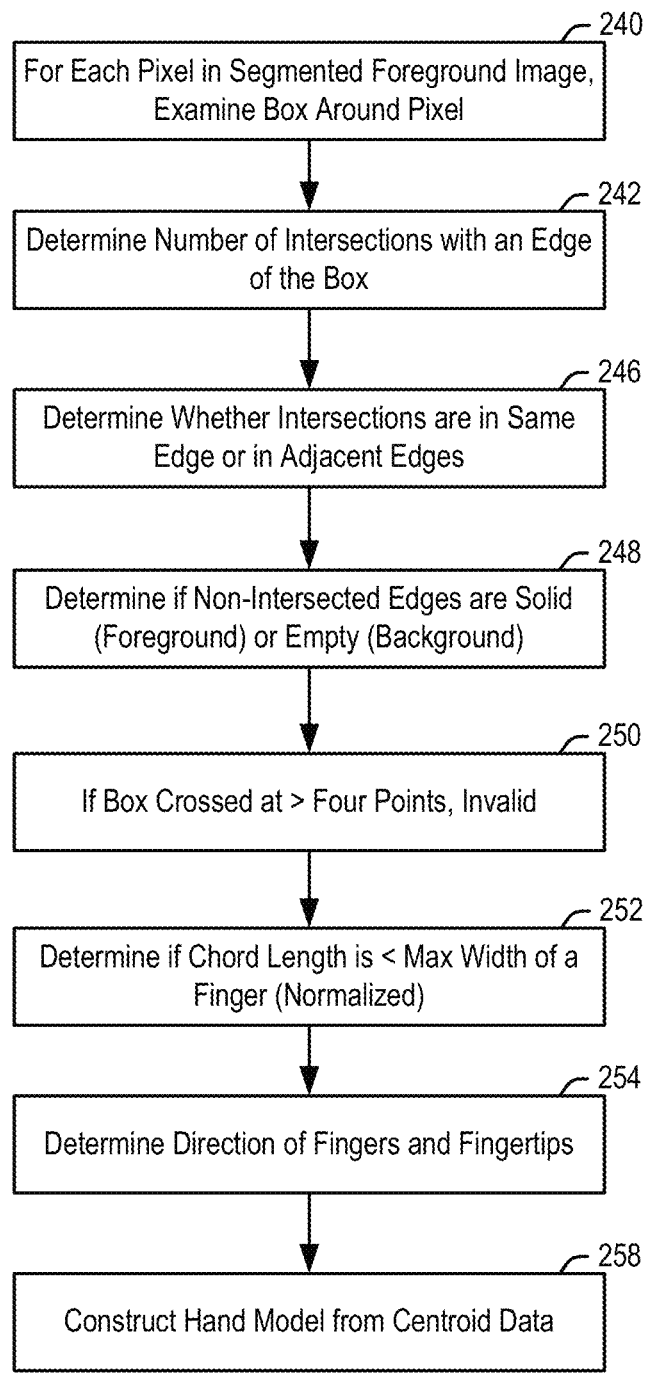
FIG. 9 is a flowchart of the operation of a pixel classification filter according to an embodiment of the present disclosure.
Figure 10:
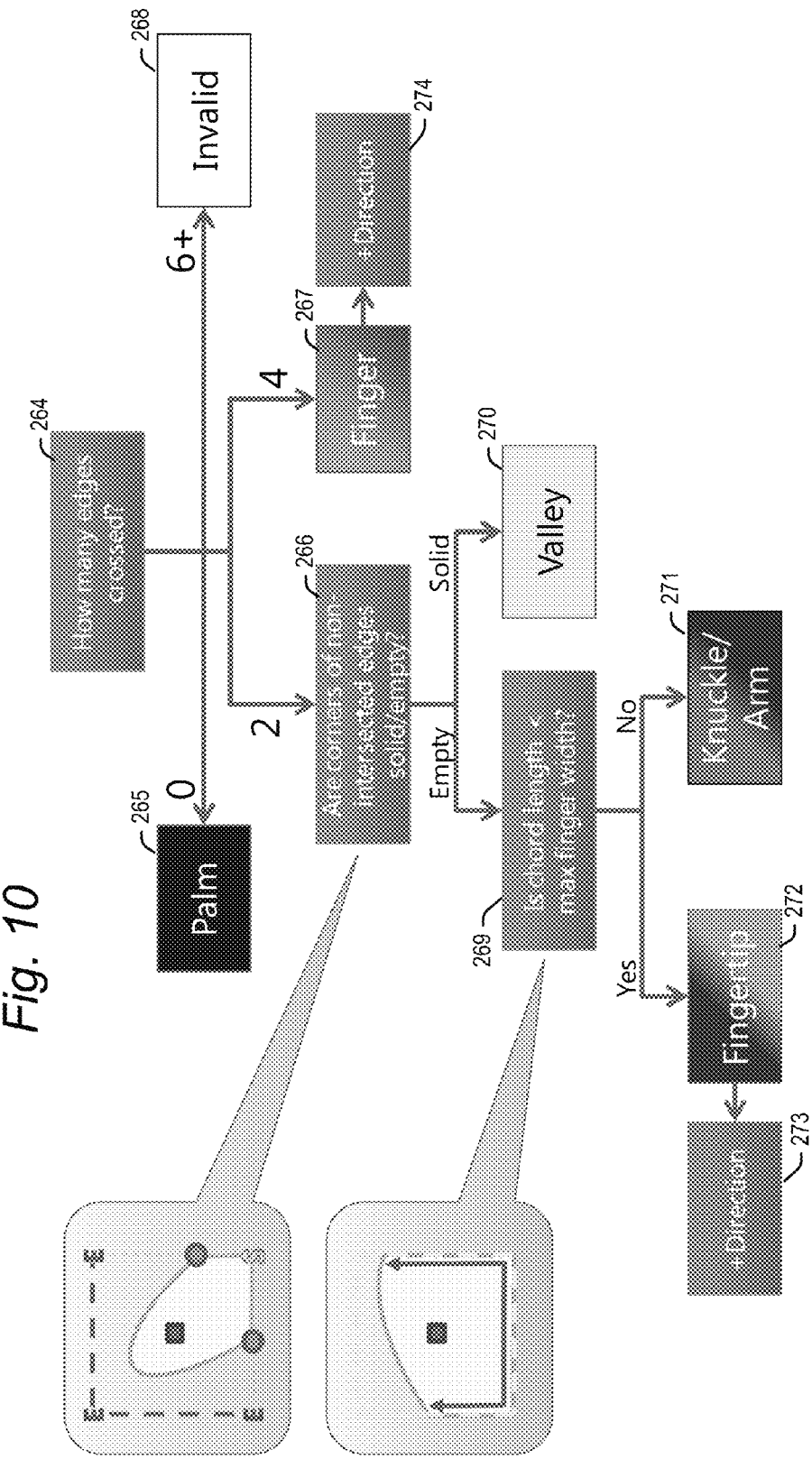
FIG. 10 is a decision tree of the operation of a pixel classification filter according to an embodiment of the present disclosure.

In step 242 of the flowchart of FIG. 9, and at 264 of the decision tree of FIG. 10, the pixel classifier filter checks how many edges of box 280 are intersected. If no edges are intersected, the selected pixel is considered to be within the user's palm at 265. That is, because the size of the box 280 is selected so that at least two edges will be intersected if the pixel lies in a finger or fingertip, if the pixel lies on the hand, and no edges are intersected, the pixel is considered to lie in the palm. If two edges are intersected, the filter goes to 266 to check whether the corners of non-intersected edges are solid (on the hand) or empty (background) as explained below. If four edges are intersected in 267, it is considered a finger as explained above. If the edges of a box 280 are intersected six times in 268, this is considered an invalid reading and is discarded (step 250).

Referring again to 266, where two edges are intersected, it could be a fingertip, but it could also be a space between two adjacent fingers. The pixel classifier filter therefore checks the corners of the non-intersected edges (step 248). Where the corners of non-intersected edges are solid, this means the box lies on the hand at those corners and the intersection points define a valley between adjacent fingers. Conversely, where the corners of non-intersected edges are empty (as shown in the illustration associated with 266), this means the box lies on background pixels at those corners and the intersection points define a part of the hand.

Figure 13:
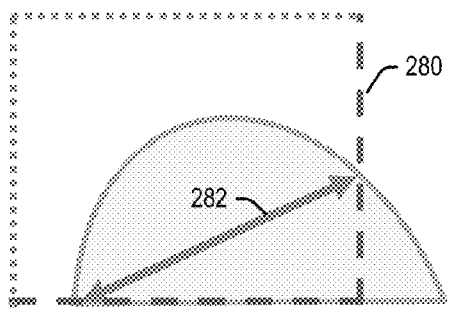
FIG. 13 illustrates a portion of a hand identified using a pixel classification filter according to an embodiment of the present disclosure.

If the corners are empty, the pixel classifier filter checks at 269 whether the distance, referred to as chord length, between the intersection points is less than the maximum width of a finger (step 252). That is, where there are two intersection points, it could be a fingertip as shown in FIG. 11A. However, the pixel could also be a part of the arm or part of the hand, such as the knuckle, as shown in FIG. 13. If so, the length of chord 282 could be greater than the maximum width of a finger. If so, the pixel 278 for which box 280 is being examined is said to lie on the arm or knuckle at 271 (FIG. 10).

In addition to identifying a fingertip or finger, a two-point or a four-point intersection also can reveal a direction in which the fingertip/finger is pointing. For example, in FIG. 11A, there were two intersections less than the maximum width of a finger, so it was determined that the pixel 278 lies in a fingertip. However, given such an intersection, inferences can be drawn about the direction in which the fingertip is pointing. The same can be said for the finger shown in FIG. 12. FIG. 11A shows the finger 276 pointing straight up. But the fingertip 276 could be pointing in other upward directions as well. Information from other points near the point 278 in fingertip 276 may be used to draw further inferences about the direction.

FIG. 11B shows a two-point intersection, which provides additional inferences about the direction the finger/fingertip is pointing. That is, the direction may be inferred from the ratio of the distances to the shared corner. Stated another way, the chord length between the points 281*a* and 281*b* defines the hypotenuse of a triangle also including the sides between the points 281*a*, 281*b* and shared corner. It may be inferred that the finger is pointing in a direction perpendicular to the hypotenuse.

It may happen that a hand is held with two fingers together, three fingers together, or four fingers together. Thus, after the above steps are run using box 280 for each pixel in the hand, the process may be repeated using a box 280 that is slightly larger than the maximum width of two fingers together, and then repeated again using a box 280 that is slightly larger than the maximum width of three fingers together, etc.

Once the pixel classifier filter data is gathered, the pixel classifier filter next attempts to construct a hand model from the data in step 258 (FIG. 9). From this information, the classifier engine 198 is able to determine whether the hand is open or closed as explained below. There are small identified regions, or centroids, such as for example regions that are a fingertip, and a region that is a palm, and an idea of the center of the palm from the hand segmentation step. The classifier engine 198 then examines finger centroids not classified as fingertips but, due to the fact that they intersected at four points, are classified as fingers. The directional orientation has also been identified for finger and fingertip regions. If a finger centroid aligns with a fingertip centroid, and they are in the correct relative location to each other, the algorithm connects those centroids as belonging to the same finger.

Figure 14:
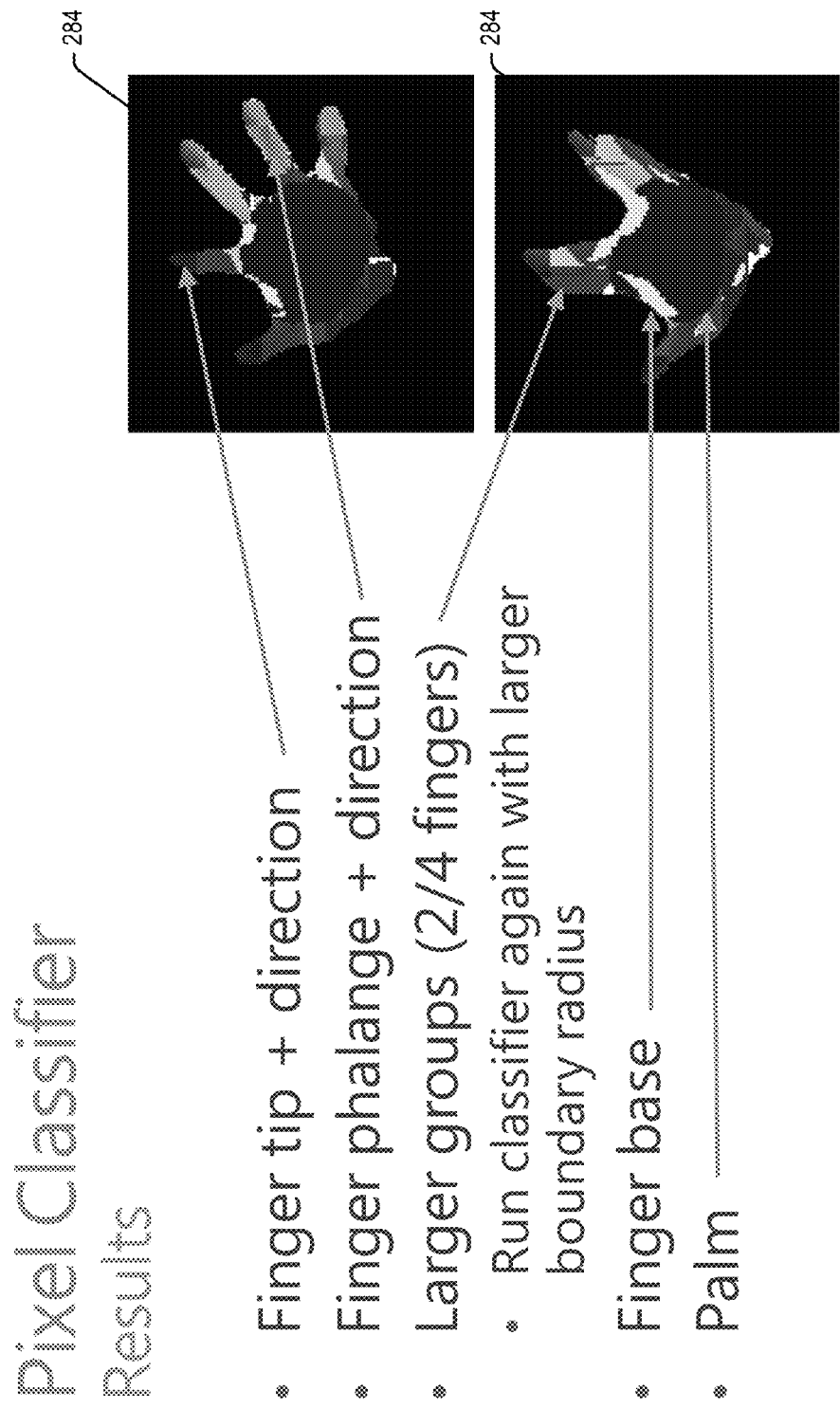
FIG. 14 illustrates hand and finger identification using a pixel classification filter according to an embodiment of the present disclosure.
Figure 15:
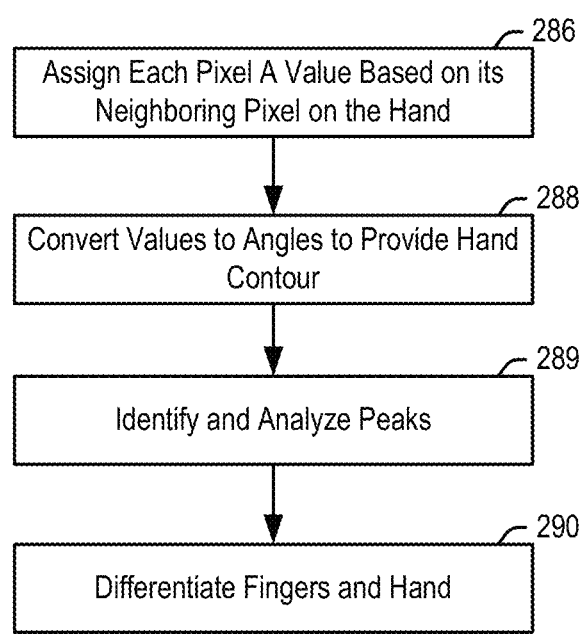
FIG. 15 is a flowchart of the operation of a curvature analysis filter according to an embodiment of the present disclosure.

Next, the orientation of the finger region is used to project where the knuckle of that finger is believed to be, based on the skeleton size and how big a finger is believed to be. The size, position and orientations of any identified valleys between fingers can also be used to confirm the determined hand model. Next, the projected knuckle position is connected to the palm. Upon completion, the pixel classifier engine determines a skeleton hand model 284, two examples of which are shown in FIG. 14. The model includes fingertip centroids connected to finger centroids, connected to knuckle centroids connected to a palm centroid. Data regarding the known geometry and possible positions of a hand from the known arm position can also be used to verify or dispute the determined positions of the fingertip, finger, knuckle and/or palm centroid positions, as well as to discard centroid data that may be determined to not form part of a hand.

The above will construct a hand model even if one or more portions of the hand are missing from the model. For example, a finger may have been occluded, or too close to the user's body or other hand to be detected. Or the user may be missing a finger. The pixel classification filter will construct a hand model using the finger and hand positions that it detects.

Figure 16:
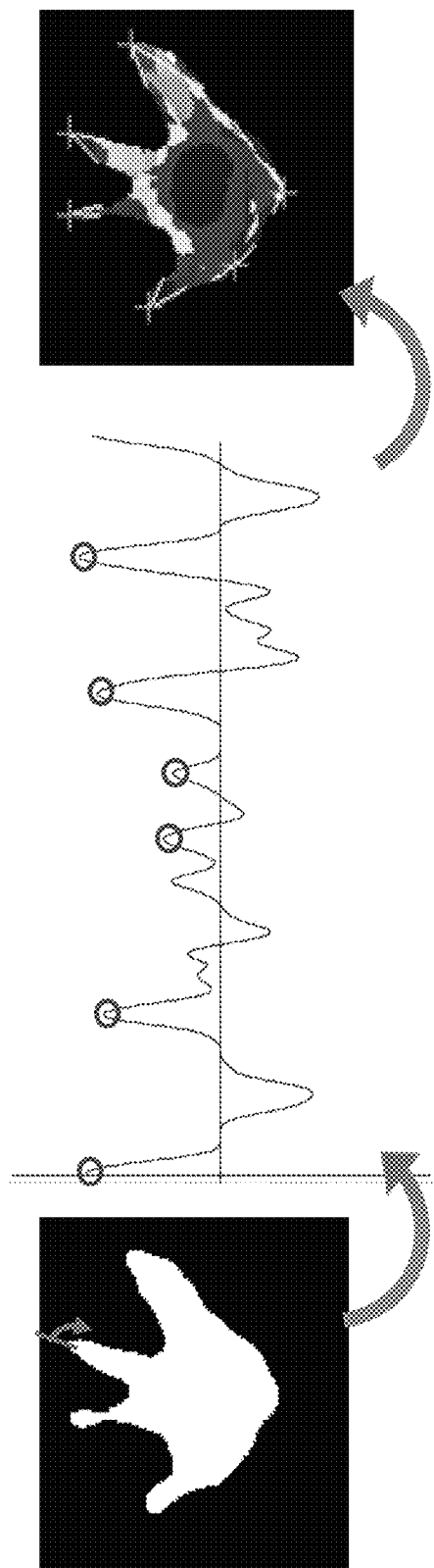
FIG. 16 illustrates hand and finger identification using a curvature analysis filter according to an embodiment of the present disclosure.

Another filter which may be run in addition to or instead of the pixel classification filter may be referred to as a curvature analysis filter. This filter focuses on the curvature along the boundaries of the segmented hand silhouette to determine peaks and valleys in an attempt to differentiate fingers. Referring to the flowchart in FIG. 15, in step 286, starting with a first pixel, the eight surrounding pixels are examined to determine which is the next pixel on the hand. Each pixel is thus assigned a value between 0 to 7 for the connectivity between that pixel and the next. A chain of these numbers is built around the silhouette of the hand which gives you the hand boundaries. These values may be converted into angles and contours around the hand in step 288 to provide a graph of hand contour and peaks, such as shown in FIG. 16. These steps for generating hand contours and peaks are described for example in a paper by F. Leymarie, M. D. Levine, titled "*Curvature morphology*", Computer Vision and Robotics Laboratory, McGill University, Montreal, Quebec, Canada, 1988, which paper is incorporated by reference herein in its entirety.

Peaks around the hand silhouette are identified in step 289, and each is analyzed with respect to various features of the peak. A peak may be defined by a start point, a peak and an end point. These three points may form a triangle as explained below. The various features of a peak that may be examined include for example:

width of a peak;
max height of a given peak;
average height of curvature samples within a peak;
peak shape ratio (max height/average height);
area of a peak;
hand to peak distance;
elbow to hand direction (x, y and z);
cross product of peak direction and arm direction (how small the angle is between the arm direction and peak direction); and
cross product of the vector between the peak start point and max point, and the vector between the max point and the end point.

This information may be run through various machine learning techniques in step 290, such as for example a support vector machine, to differentiate fingers and the hand. Support vector machines are known and described for example in C. Cortes and V. Vapnik, titled *Support-Vector Networks*, Machine Learning, 20(3):273-297, September 1995, and Vladimir N. Vapnik, titled *The Nature of Statistical Learning Theory*. Springer, New York, 1995, both of which are incorporated by reference herein in their entirety. Other machine learning techniques may be used and include for example regression, nearest neighbor, (un)supervised clustering, etc. In embodiments, noisy data may be smoothed using a Hidden Markov Model to maintain the state of the hands and filter out noise. The curvature analysis filter works well to identify an open hand facing the capture device 20, but may also be used to identify a closed hand.

The above-described filters may be referred to as silhouette filters in that they examine the data relating to the silhouette of a hand. A further filter which may be used is a histogram filter and is referred to as a depth filter in that it uses depth data to construct a hand model. This filter may be used in addition to or instead of the above-described filters, and may be particularly useful when a user has his or hand pointed toward the image capture device 20.

In the histogram filter, a histogram of distances in the hand region may be constructed. For example, such a histogram may include fifteen bins, where each bin includes the number of points in the hand region whose distance in the Z-direction (depth) from the closest point to the camera is within a certain distance range associated with that bin. For example, the first bin in such a histogram may include the number of points in the hand region whose distance to the hand centroid is between 0 and 0.40 centimeters, the second bin includes the number of points in the hand region whose distance to the hand centroid is between 0.40 and 0.80 centimeters, and so forth. In this way, a vector may be constructed to codify the shape of the hand. Such vectors may further be normalized based on estimated body size, for example.

In general, by analyzing the distribution over the bins, it can be determined whether a hand pointing toward the capture device 20 is open or closed. If the distribution is front heavy (the first few bins have a large number of pixels compared to the last few bins), it can be inferred that the hand is closed. If the distribution is back heavy (last few bins have a large number of pixels compared to the first few bins), it can be inferred that the hand is open and pointed toward the capture device 20. Thus, the open or closed state may be inferred from mass distribution as indicated by the histogram. Alternatively, the histograms can be used as features by various machine learning classification techniques (described herein) for learning to predict hand states automatically.

Figure 17:
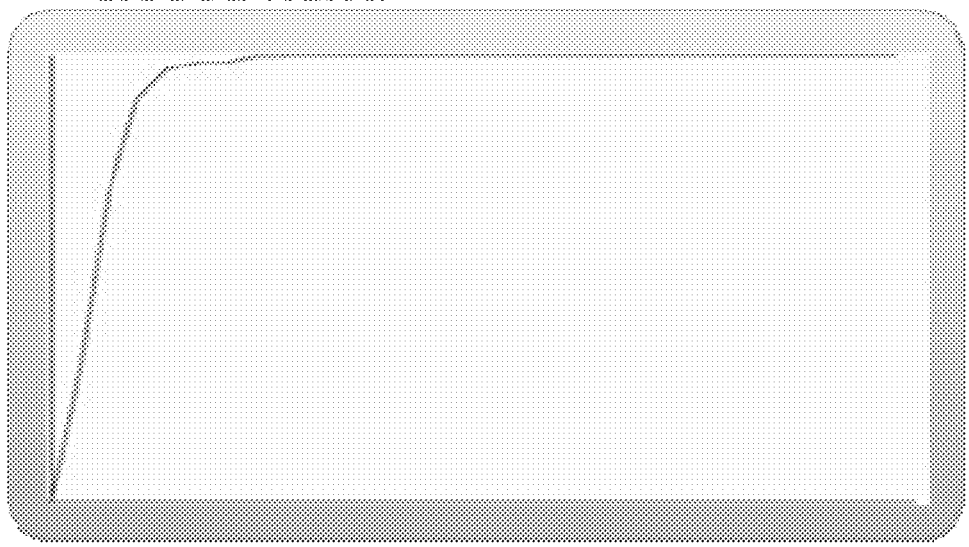
FIG. 17 illustrates open and closed hand analysis using a depth histogram filter according to an embodiment of the present disclosure.
Figure 17:
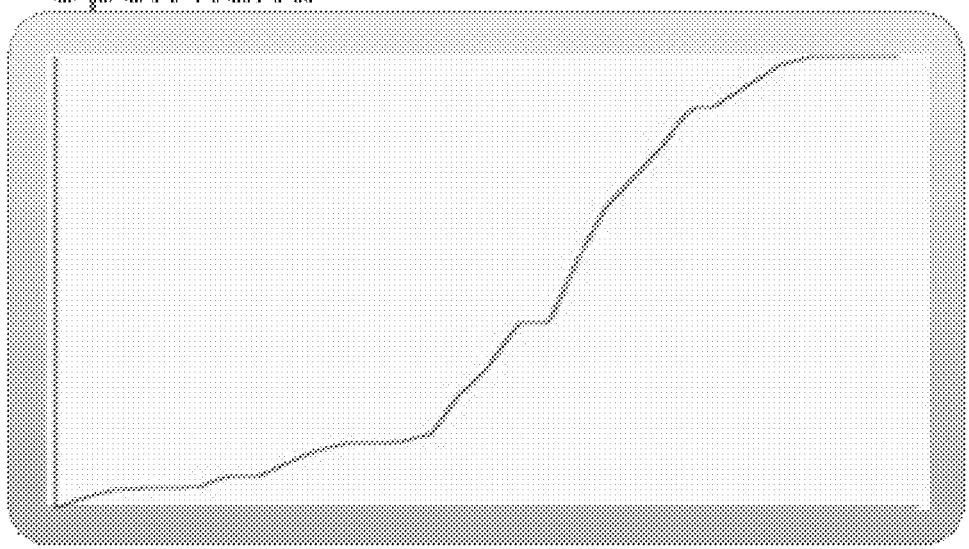

In another example approach, a histogram may be constructed based on distances and/or angles from points in the hand region to a joint, bone segment or palm plane from the user's estimated skeleton, e.g., the elbow joint, wrist joint, etc. FIG. 17 illustrates two graphs indicative of the histograms determined for a closed hand and an open hand.

A further filter is a Fourier descriptor. Construction of a Fourier descriptor may include codifying a contour of the hand region, e.g., via mapping a distance from each pixel in the hand region to a perimeter of the hand region against a radius of an elliptical fitting of the boundary of the hand and then performing a Fourier transform on the map. Further, such descriptors may be normalized, e.g., relative to an estimated body size. Such descriptors may be invariant to translation, scale, and rotation.

Still another filter includes determining a convexity of the hand region, e.g., by determining a ratio of an area of a contour of the hand region to the convex hull of the hand region.

Figure 18:
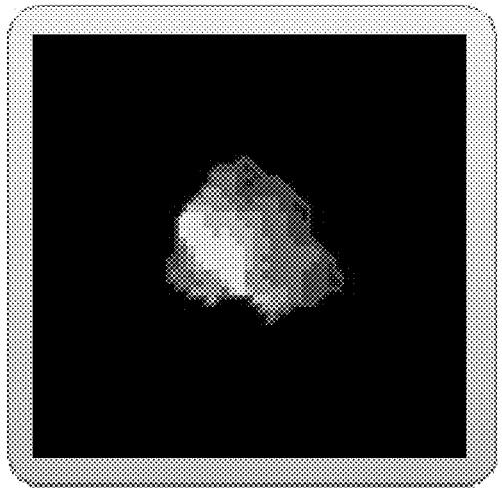
FIG. 18 illustrates open and closed hand images using statistical filters according to an embodiment of the present disclosure.
Figure 18:
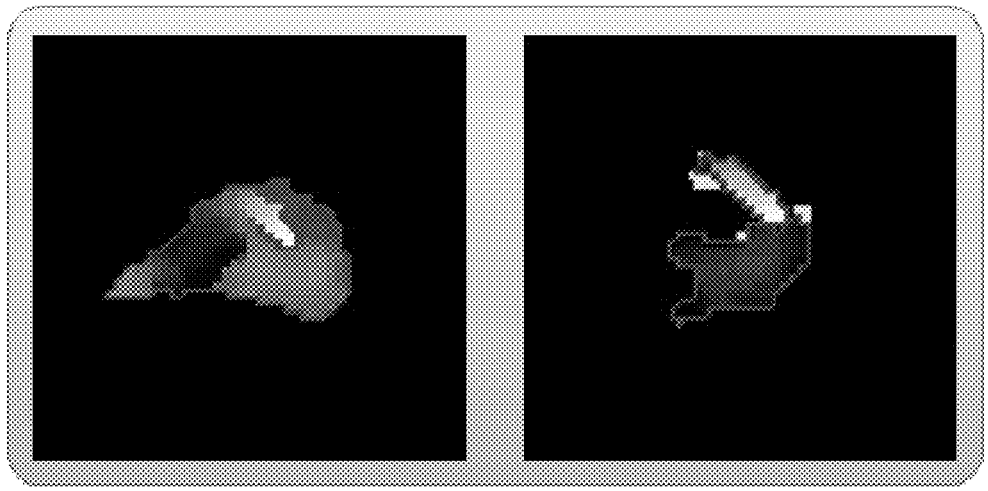
Figure 19:
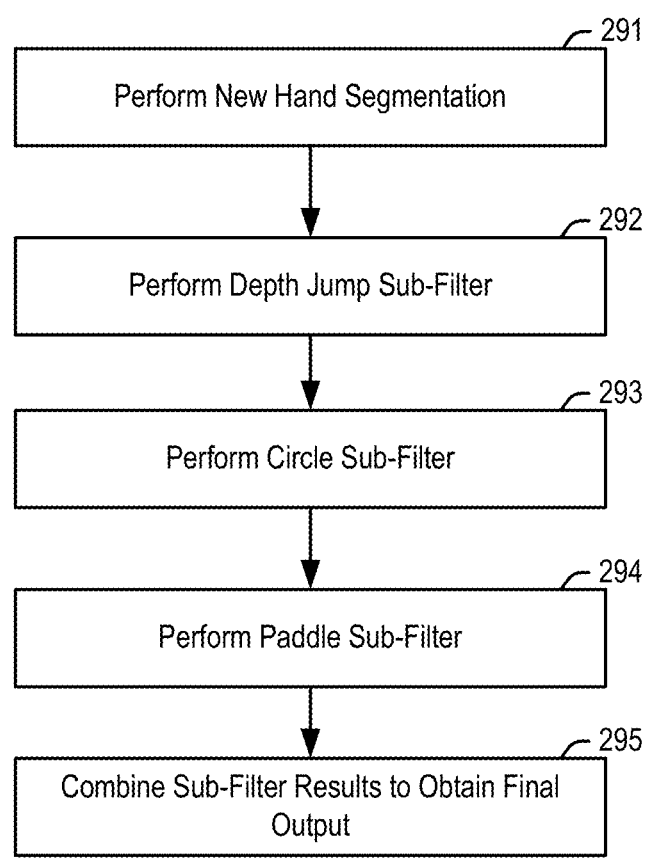
FIG. 19 is a flowchart of the operation of a natural grab filter according to an embodiment of the present disclosure.

A further filter which may be useful in the event the above filters provide insufficient information is referred to as a discontinuity filter. Such a filter does not provide recognition or location information, but assumes the image is of a hand and identifies whether the hand is open or closed. The discontinuity filter is based on the fact that a closed fist is relatively smooth and has few contour discontinuities in comparison to the contour of an open hand. Thus, if the measured contour discontinuities are below some predetermined threshold, the discontinuity filter identifies a closed hand. If the measured contour discontinuities are above the predetermined threshold, the discontinuity filter identifies an open hand. Examples of such image data are shown in FIGS. 18.

A further filter for detecting the open/closed state of the hand is referred to as a natural grab filter. In general, a natural grab filter detects a movement where the user reaches towards the capture device 20, and opens and closes his or her hand. The palm may or may not be facing the capture device 20. A further explanation of the natural grab filter is explained with reference to the flowchart of FIG. 19. In step 291, a further segmentation is performed. This further segmentation examines the elbow-to-hand vector given by the skeletal recognition engine 192 that describes the lower arm. The natural grab filter then iterates over the current hand segmentation and for each pixel, it figures out how far from the elbow that pixel is. Only those pixels which are the furthest from the elbow are maintained, where furthest is defined as a window based on the user's particular skeleton size. As one example, it might be a four inch window for an adult that starts at the furthest point from the elbow. That window may change for a child or someone who is smaller.

At this point one or more of three sub-filters are performed. The first measures depth changes, or jumps. In step 292, the depth jump sub-filter iterates over each pixel row and column in the newly segmented hand image. The iteration may be performed over all rows and then all column, or vice-versa. This sub-filter counts the number of depth jumps, where a depth jump is considered a large jump in the depth reading in the image from one pixel to the next. Upon iterating over all rows and columns, the sub-filter comes up with a percentage of rows and columns that have depth jumps.

Based on that percentage, the depth jump sub-filter can form a reasonable estimate of whether or not the hand is open or closed. A closed hand will have significantly fewer depth jumps than an open hand because an open hand will have depth jumps given the spaces between fingers (depth jumps may also be caused by other reasons, such as camera data noise resulting for example open fingers). Because the output of the depth jump sub-filter is a percentage it is invariant to hand size. The output can be binary (open/closed) based on some predefined threshold percentage value established from testing. Alternatively or additionally, the output can be an open/closed output with a confidence value (how close to the threshold the percentage is).

The second sub-filter may be referred to as a circle sub-filter. In step 293, the circle sub-filter examines the silhouette of the newly segmented hand image in order to determine whether the silhouette is generally circular or not. If generally circular, this indicates a closed hand. If the hand is open in any way where the segmented image includes fingers or extra noise from the camera, it will be less circular.

The way this determination is made is to calculate the center of mass of the newly segmented hand and then examine the standard deviation of the radii of the silhouette of that image. A closed fist is close to circular and the standard deviation of the different radii from the center to the edge of the silhouette will be relatively small. The standard deviation would be higher for something that is non-circular because there is more variation. Thus, based on the standard deviation value, the circle sub-filter outputs an estimate of whether the hand is open or closed. This filter also works whether the hand is in silhouette perpendicular to a ray from the capture device, or pointing at the capture device. The output of the circle sub-filter can be binary (open/closed) based on some predefined threshold standard deviation value established from testing. Alternatively or additionally, the output can be an open/closed output with a confidence value (how close to the threshold the standard deviation is).

The third sub-filter may be referred to as a paddle sub-filter. In step 294, the paddle sub-filter examines whether the user has their hand or their fingers extended, so an open hand, but all of their fingers are together, essentially forming a paddle. The paddle sub-filter generates a histogram with bins from the fingertips back toward the elbow, and it examines the number of pixels in each of the bins. It then analyzes whether the bins appear to be getting larger, or if they are staying constant and eventually getting smaller.

The idea is that when a hand is held as a paddle with the fingertips together, there will be fewer pixels at the fingertips and they'll grow toward the center of the hand. Conversely, if a hand is closed in a fist, there will be relatively more pixels at the top where the fist is and it will taper off toward the wrist and arm. Thus, using histograms of the paddle sub-filter and analyzing the obtained bins using the known configuration of the hand when in a paddle versus a fist, the paddle sub-filter is able to provide an estimate of whether the segmented hand is open or closed. Again, the output of the paddle sub-filter can be binary (open/closed) based on some predefined threshold values established from testing. Alternatively or additionally, the output can be an open/closed output with a confidence value (how close to the threshold the value is).

In step 295, the results from the sub-filters are combined to obtain a final output or estimate of whether the hand is open or closed. The combination of step 295 uses a decision tree that looks at the open and closed and a confidence value for each of these filters and combines them together for a final open/closed output. The decision tree may be customized to maximize the strength and minimize the weakness of each sub-filter. The depth jump sub-filter may be the most reliable. Thus, when the output of the depth jump sub-filter has a confidence above some threshold, this may be taken as the final output.

The results of the circle sub-filter may be the next most reliable. If the results of the depth jump sub-filter do not have a confidence above the threshold, or if the output of the depth jump sub-filter and circle sub-filter disagree, then the results of the circle sub-filter may be considered along with its confidence value. If a high confidence value, the output of the circle sub-filter may be taken as the final output.

The results of the paddle sub-filter may be the next most-reliable. If neither of the depth jump or circle sub-filters provide confident results, the results of the paddle filter may be considered and used as the final output if it has a confidence value above some threshold.

The same decision tree-type of analysis may be used to consider the results of the other above-described filters. In one embodiment, if the curvature analysis filter provides an output with a confidence above some predetermined threshold, that result may be taken as the final output. If the confidence of the curvature analysis filter is not above the threshold, the confidence of the histogram filter may be examined. If above some predetermined threshold, that result may then be taken as the final output. If the confidence of the histogram filter is not above the threshold, the confidence of the natural grab filter may be examined. If above some predetermined threshold, that result may then be taken as the final output.

The above-described filters may be normalized and/or invariant to different sized hands. The different filters may also be extensible to multiple players, and to one or both hands of each such player.

It should be understood that the filter examples of shape descriptors are exemplary in nature and are not intended to limit the scope of this disclosure. In general, any suitable shape descriptor for a hand region may be used alone or in combination with each other and/or one of the example methods described above. For example, shape descriptors, such as the histograms or vectors described above, may be mixed and matched, combined, and/or concatenated into larger vectors, etc. This may allow the identification of new patterns that were not identifiable by looking at them in isolation. These filters may be augmented by the use of historical frame data, which can indicate whether an identified finger, for example, deviates too much from that finger identified in a previous frame.

Continuing with the pipeline shown in FIG. 6, using the information from the filters described above, the classifier engine 198 (FIG. 2) is able to classify the hands in step 214.

For example, the shape descriptor extracted at step 210 may be classified based on stored training data to estimate the state of the hand. For example, as illustrated at 310 in FIG. 7, hands may be classified as open or closed. In some examples, training data may comprise labeled depth image examples of various hand states. Training data may be real or synthetically generated, depicting full or upper-body 3D models with different body sizes and arm orientations, as well as different articulated hand poses based on motion capture or hand-designed hand poses. Synthetic images can be degraded to simulate noisy real images.

In some examples, the training data used in the classification step 214 may be based on a pre-determined set of hand examples. The hand examples may be grouped or labeled based on a representative hand state against which the shape descriptor for the hand region is compared.

In some examples, various meta-data may be used to partition the training data. For example, the training data may include a plurality of hand state examples which may be partitioned based on one or more of hand side (e.g., left or right), hand orientation (e.g., lower arm angle or lower arm orientation), depth, and/or a body size of the user, for example. Partitioning of these training hand examples into separate subsets may reduce variability in hand shape within each partition which may lead to more accurate overall classification of hand state.

Additionally, in some examples, the training data may be specific to a particular application. That is, the training data may depend on expected actions in a given application, e.g., an expected activity in a game, etc. Further, in some examples, the training data may be user specific. For example, an application or game may include a training module wherein a user performs one or more training exercises to calibrate the training data. For example, a user may perform a sequence of open and closed hand postures to establish a training data set used in estimating user hand states during a subsequent interaction with the system.

Classification of a user's hand may be performed based on training examples in a variety of ways. For example, various machine learning techniques may be employed in the classification. Non-limiting examples include: support vector machine training, regression, nearest neighbor, (un)supervised clustering, etc.

Figure 20:
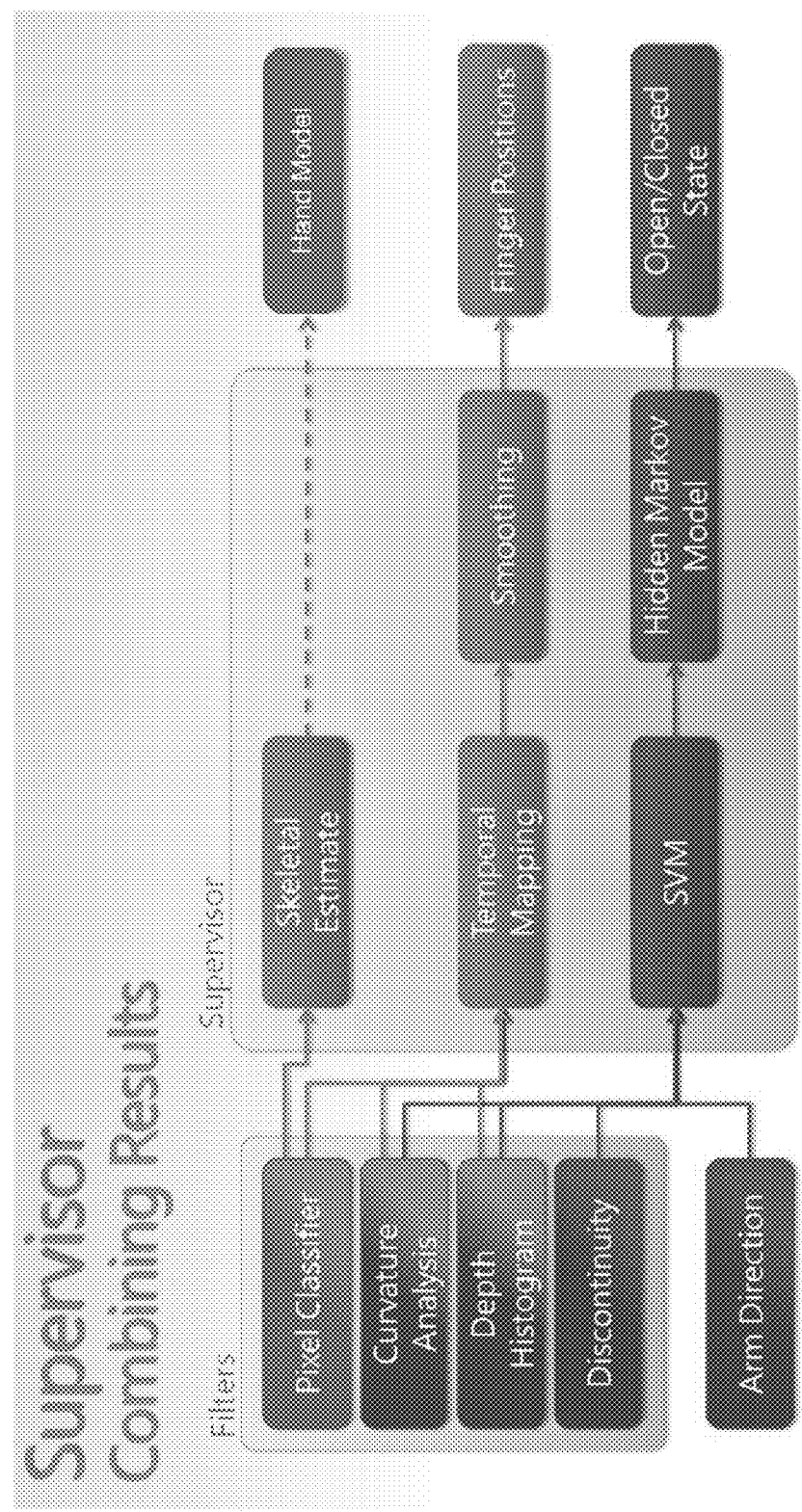
FIG. 20 is a flow diagram of a supervisor filter for classifying a hand position based on hand filters.

FIG. 20 shows a supervisor filter for combining the results of various filters described above. For example, the curvature analysis filter, the depth histogram filter, the discontinuity filter, other open/closed filters not shown in FIG. 20 and data related to the arm direction may be supplied to a machine such as for example a support vector machine. The results may be further refined using a Hidden Markov model to provide an indication of an open or closed hand. As mentioned above, the silhouette used in various filters described herein may be scaled to be hand-size and sensor-distance invariant through knowledge of the user's distance from the camera and hand-size inferred from their analyzed skeleton.

As discussed above, classification techniques may use labeled depth image examples of various hand states for predicting the likelihood of an observed hand as being in one of several states. Additionally, confidences may be added to a classification either during or following the classification step. For example, confidence intervals may be assigned to an estimated hand state based on the training data or by fitting a sigmoid function, or other suitable error function, to the output of the classification step.

As a simple, non-limiting example of classifying a hand state, there may be two possible hand states, open or closed, such as shown at 310 in FIG. 7. In this example, the training data may include two labeled hand sets: a first set of hand examples representing hand states that are open or approximately open and a second set of hand examples representing hand states that are closed or approximately closed. In this way, when given an extracted shape descriptor for an identified hand region, the extracted shape descriptor of the identified hand region may be compared to hand examples of the first (open) and second (closed) hand sets to determine a likelihood that the identified hand region falls in each set. The state of the hand may then be estimated based on the higher likelihood.

In addition to open or closed hand states, the present technology may be used to identify specific finger orientations, such as for example pointing in a particular direction with one or more fingers. The technology may also be used to identify various hand positions where the fingers are somewhere between an open and closed state, and oriented at various angles within x, y, z Cartesian space.

For example, as shown in FIG. 7 at 310, the identified hand region is determined to have a higher likelihood of being open, thus is classified as such. Additionally, in some examples, the determined likelihoods of the identified hand being in a particular hand state may be used to establish confidence intervals to the estimation of the hand state.

In embodiments, various post-classification filtering steps may be employed to increase accuracy of the hand state estimations in step 216 (FIG. 6). For example, a temporal-consistency filtering, e.g., a low-pass filter, step may be applied to predicted hand states between consecutive depth image frames to smooth the predictions and reduce temporal uttering, e.g., due to spurious hand movements, sensor noise, or occasional classification errors. That is, a plurality of states of a user's hand based on a plurality of depth images from the capture device or sensor may be estimated and temporal filtering of the plurality of estimates to estimate the state of the hand may be performed. Further, in some examples, classification results may be biased toward one state or another (e.g., toward open or closed hands), as some applications may be more sensitive to false positives (in one direction or another) than other applications.

In step 220, the pipeline of FIG. 6 may output a response each frame based on the estimated hand state. For example, a command may be output to a console of a computing system, such as console 12 of computing system 10. As another example, a response may be output to a display device, such as display device 16. In this way, estimated motions of the user, including estimated hand states, may be translated into commands to a console 12 of the system 10, so that the user may interact with the system as described above. Further, the method and processes described above may be implemented to determine estimates of states of any part of a user's body, e.g., mouth, eyes, etc. For example, a posture of a body part of a user may be estimated using the methods described above.

The present technology enables a wide variety of interactions with a NUI system such as for example shown in FIGS. 1A-1C. There are a wide range of natural interactions that are based on hand/finger movements, or combine both large body motions and fine grained hand control that are desirable to create new recognized gestures, more immersive experiences and compelling games. These uses and interactions include but are not limited to the following:

Grab/release mechanics—by being able to accurately determine each frame whether a user's hand is open or closed, a NUI system or application is able to determine with precision when it performs a grab or release motion. Thus, for example, in a game where a user is throwing an object, the NUI system or application is able to determine a precise release point when the user intends to release a thrown object (transition from closed to open hand). Other examples include, but are not limited to, climbing, sling shot, balloon toss, and pulling virtual levers.

Pull objects—using open and closed hand detection to pull virtual objects—rope, levers, etc.

Initiate/Terminate action—open hand to initiate and persist an action, close hand to terminate it. An example includes use of a fire hose within a game—open hand turns it on, the hand and arm orientation directs the hose, close hand turns it off.

Other finger and hand interactions are contemplated.

Figure 21A:
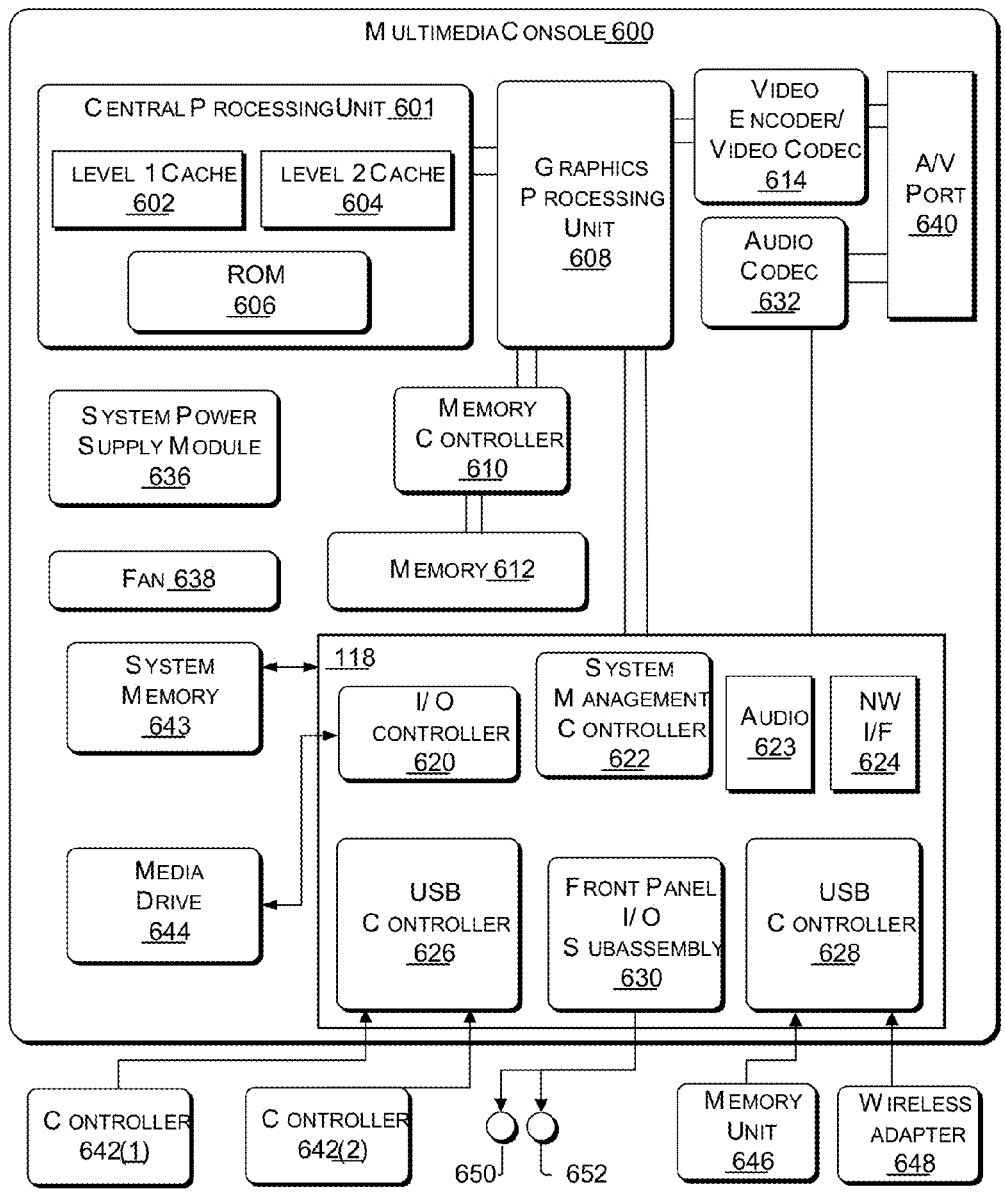
FIG. 21A illustrates an example embodiment of a computing environment that may be used to interpret one or more gestures in a target recognition, analysis, and tracking system.

FIG. 21A illustrates an example embodiment of a computing environment that may be used to interpret one or more positions and motions of a user in a target recognition, analysis, and tracking system. The computing environment such as the computing environment 12 described above with respect to FIGS. 1A-2 may be a multimedia console 600, such as a gaming console. As shown in FIG. 21A, the multimedia console 600 has a central processing unit (CPU) 601 having a level 1 cache 602, a level 2 cache 604, and a flash ROM 606. The level 1 cache 602 and a level 2 cache 604 temporarily store data and hence reduce the number of memory access cycles, thereby improving processing speed and throughput. The CPU 601 may be provided having more than one core, and thus, additional level 1 and level 2 caches 602 and 604. The flash ROM 606 may store executable code that is loaded during an initial phase of a boot process when the multimedia console 600 is powered ON.

A graphics processing unit (GPU) 608 and a video encoder/video codec (coder/decoder) 614 form a video processing pipeline for high speed and high resolution graphics processing. Data is carried from the GPU 608 to the video encoder/video codec 614 via a bus. The video processing pipeline outputs data to an A/V (audio/video) port 640 for transmission to a television or other display. A memory controller 610 is connected to the GPU 608 to facilitate processor access to various types of memory 612, such as, but not limited to, a RAM.

The multimedia console 600 includes an I/O controller 620, a system management controller 622, an audio processing unit 623, a network interface controller 624, a first USB host controller 626, a second USB host controller 628 and a front panel I/O subassembly 630 that are preferably implemented on a module 618. The USB controllers 626 and 628 serve as hosts for peripheral controllers 642(1)-642(2), a wireless adapter 648, and an external memory device 646 (e.g., flash memory, external CD/DVD ROM drive, removable media, etc.). The network interface 624 and/or wireless adapter 648 provide access to a network (e.g., the Internet, home network, etc.) and may be any of a wide variety of various wired or wireless adapter components including an Ethernet card, a modem, a Bluetooth module, a cable modem, and the like.

System memory 643 is provided to store application data that is loaded during the boot process. A media drive 644 is provided and may comprise a DVD/CD drive, hard drive, or other removable media drive, etc. The media drive 644 may be internal or external to the multimedia console 600. Application data may be accessed via the media drive 644 for execution, playback, etc. by the multimedia console 600. The media drive 644 is connected to the I/O controller 620 via a bus, such as a Serial ATA bus or other high speed connection (e.g., IEEE 1394).

The system management controller 622 provides a variety of service functions related to assuring availability of the multimedia console 600. The audio processing unit 623 and an audio codec 632 form a corresponding audio processing pipeline with high fidelity and stereo processing. Audio data is carried between the audio processing unit 623 and the audio codec 632 via a communication link. The audio processing pipeline outputs data to the A/V port 640 for reproduction by an external audio player or device having audio capabilities.

The front panel I/O subassembly 630 supports the functionality of the power button 650 and the eject button 652, as well as any LEDs (light emitting diodes) or other indicators exposed on the outer surface of the multimedia console 600. A system power supply module 636 provides power to the components of the multimedia console 600. A fan 638 cools the circuitry within the multimedia console 600.

The CPU 601, GPU 608, memory controller 610, and various other components within the multimedia console 600 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 600 is powered ON, application data may be loaded from the system memory 643 into memory 612 and/or caches 602, 604 and executed on the CPU 601. The application may present a graphical user interface that provides a consistent user experience when navigating to different media types available on the multimedia console 600. In operation, applications and/or other media contained within the media drive 644 may be launched or played from the media drive 644 to provide additional functionalities to the multimedia console 600.

The multimedia console 600 may be operated as a standalone system by simply connecting the system to a television or other display. In this standalone mode, the multimedia console 600 allows one or more users to interact with the system, watch movies, or listen to music. However, with the integration of broadband connectivity made available through the network interface 624 or the wireless adapter 648, the multimedia console 600 may further be operated as a participant in a larger network community.

When the multimedia console 600 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 600 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 601 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 642(1) and 642(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 600.

Figure 21B:
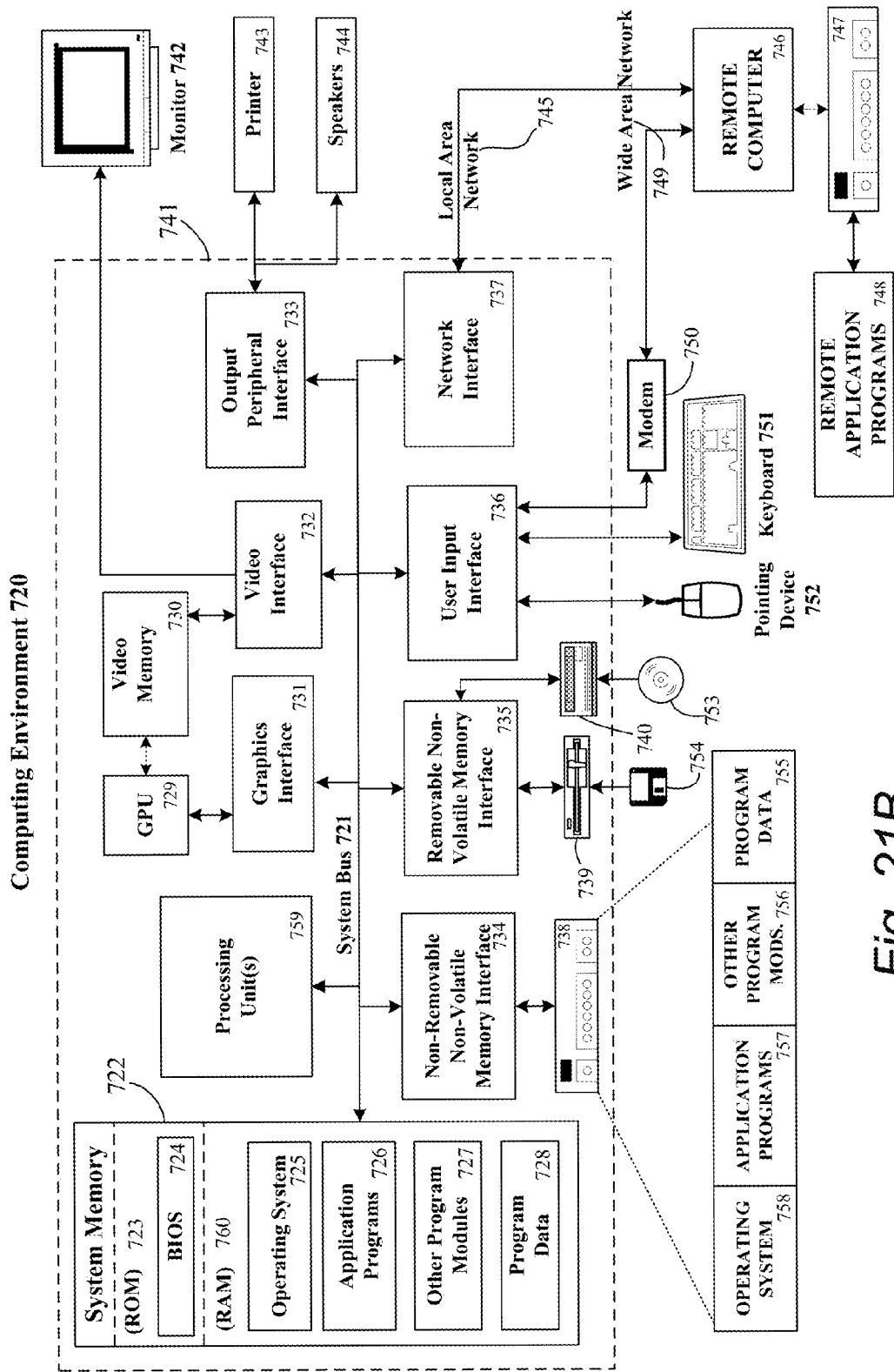
FIG. 21B illustrates another example embodiment of a computing environment that may be used to interpret one or more gestures in a target recognition, analysis, and tracking system.

FIG. 21B illustrates another example embodiment of a computing environment 720 that may be the computing environment 12 shown in FIGS. 1A-2 used to interpret one or more positions and motions in a target recognition, analysis, and tracking system. The computing system environment 720 is only one example of a suitable computing environment and is not intended to suggest any limitation as to the scope of use or functionality of the presently disclosed subject matter. Neither should the computing environment 720 be interpreted as having any dependency or requirement relating to any one or combination of components illustrated in the Exemplary operating environment 720. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 21B, the computing environment 720 comprises a computer 741, which typically includes a variety of computer readable media. Computer readable media can be any available media that can be accessed by computer 741 and includes both volatile and nonvolatile media, removable and non-removable media. The system memory 722 includes computer storage media in the form of volatile and/or nonvolatile memory such as ROM 723 and RAM 760. A basic input/output system 724 (BIOS), containing the basic routines that help to transfer information between elements within computer 741, such as during start-up, is typically stored in ROM 723. RAM 760 typically contains data and/or program modules that are immediately accessible to and/or presently being operated on by processing unit 759. By way of example, and not limitation, FIG. 21B illustrates operating system 725, application programs 726, other program modules 727, and program data 728. FIG. 21B further includes a graphics processor unit (GPU) 729 having an associated video memory 730 for high speed and high resolution graphics processing and storage. The GPU 729 may be connected to the system bus 721 through a graphics interface 731.

The computer 741 may also include other removable/non-removable, volatile/nonvolatile computer storage media. By way of example only, FIG. 21B illustrates a hard disk drive 738 that reads from or writes to non-removable, nonvolatile magnetic media, a magnetic disk drive 739 that reads from or writes to a removable, nonvolatile magnetic disk 754, and an optical disk drive 740 that reads from or writes to a removable, nonvolatile optical disk 753 such as a CD ROM or other optical media. Other removable/non-removable, volatile/nonvolatile computer storage media that can be used in the Exemplary operating environment include, but are not limited to, magnetic tape cassettes, flash memory cards, digital versatile disks, digital video tape, solid state RAM, solid state ROM, and the like. The hard disk drive 738 is typically connected to the system bus 721 through a non-removable memory interface such as interface 734, and magnetic disk drive 739 and optical disk drive 740 are typically connected to the system bus 721 by a removable memory interface, such as interface 735.

The drives and their associated computer storage media discussed above and illustrated in FIG. 21B, provide storage of computer readable instructions, data structures, program modules and other data for the computer 741. In FIG. 21B, for example, hard disk drive 738 is illustrated as storing operating system 758, application programs 757, other program modules 756, and program data 755. Note that these components can either be the same as or different from operating system 725, application programs 726, other program modules 727, and program data 728. Operating system 758, application programs 757, other program modules 756, and program data 755 are given different numbers here to illustrate that, at a minimum, they are different copies. A user may enter commands and information into the computer 741 through input devices such as a keyboard 751 and a pointing device 752, commonly referred to as a mouse, trackball or touch pad. Other input devices (not shown) may include a microphone, joystick, game pad, satellite dish, scanner, or the like. These and other input devices are often connected to the processing unit 759 through a user input interface 736 that is coupled to the system bus, but may be connected by other interface and bus structures, such as a parallel port, game port or a universal serial bus (USB). The cameras 26, 28 and capture device 20 may define additional input devices for the console 700. A monitor 742 or other type of display device is also connected to the system bus 721 via an interface, such as a video interface 732. In addition to the monitor, computers may also include other peripheral output devices such as speakers 744 and printer 743, which may be connected through an output peripheral interface 733.

The computer 741 may operate in a networked environment using logical connections to one or more remote computers, such as a remote computer 746. The remote computer 746 may be a personal computer, a server, a router, a network PC, a peer device or other common network node, and typically includes many or all of the elements described above relative to the computer 741, although only a memory storage device 747 has been illustrated in FIG. 21B. The logical connections depicted in FIG. 21B include a local area network (LAN) 745 and a wide area network (WAN) 749, but may also include other networks. Such networking environments are commonplace in offices, enterprise-wide computer networks, intranets and the Internet.

When used in a LAN networking environment, the computer 741 is connected to the LAN 745 through a network interface or adapter 737. When used in a WAN networking environment, the computer 741 typically includes a modem 750 or other means for establishing communications over the WAN 749, such as the Internet. The modem 750, which may be internal or external, may be connected to the system bus 721 via the user input interface 736, or other appropriate mechanism. In a networked environment, program modules depicted relative to the computer 741, or portions thereof, may be stored in the remote memory storage device. By way of example, and not limitation, FIG. 21B illustrates remote application programs 748 as residing on memory device 747. It will be appreciated that the network connections shown are Exemplary and other means of establishing a communications link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed:

1. A method for generating a model of a user's hand including one or more fingers, comprising:
   (a) receiving position data in a computing device representing a position of a user interacting with a sensor associated with the computing device, the position data including at least one of depth and image data representing the user's hand; and
   (b) analyzing the position data to identify whether the hand is in an open or closed state, said step (b) including the steps of:
      (b)(1) analyzing depth data from the position data captured in said step (a) to segment the position data into data of the hand, and
      (b)(2) extracting a set of feature descriptors by applying one or more filters to the image data of the hand identified in said step (b)(1), the one or more filters analyzing image data of the hand as compared to image data outside of a boundary of the hand to discern features of the hand including a shape of the hand.

2. The method of claim 1, further comprising the steps of running an application receiving commands via the sensor, and affecting a control action in the application based on whether the hand is open or closed as identified in said step (b).

3. The method of claim 1, further comprising the steps of running a gaming application receiving commands via the sensor, and affecting an action in the gaming application based on whether the hand is open or closed as identified in said step (b).

4. The method of claim 1, wherein said step (b)(1) comprises the step of analyzing centroids constructed from the image data to locate a best candidate of a hand.

5. The method of claim 4, wherein said step (b)(1) further comprises the step of analyzing the best candidate of a hand to determine a best candidate of the center of the hand.

6. The method of claim 1, wherein said step (b)(2) comprises the steps of applying a pixel classifier including the steps of:
   selecting pixels within a boundary of the shape descriptor of the hand,
   constructing a box of predetermined size around each pixel, each box constructed in a plane of the shape descriptor,
   determining intersection points with each box where the image data transitions between a foreground point and a background point, and
   identifying whether a hand is open or closed from analyzing the intersection points of each box for each examined pixel.

7. The method of claim 1, wherein said step (b)(2) comprises the steps of applying a curvature analysis filter including the steps of:
   selecting pixels along a boundary of the shape descriptor of the hand,
   examining a plurality of pixels surrounding a selected pixel, and assigning a value to the selected pixel indicating which surrounding pixel is also along a boundary of the shape descriptor,
   converting the values into angles and contours around the hand including peaks and valleys, and
   determining which of the peaks represent open or closed fingers of the hand.

8. The method of claim 1, wherein said step (b)(2) comprises the steps of applying a natural grab filter including the step of detecting a movement of the hand toward the sensor with fingers moving from an open to closed state.

9. A system for determining whether a detected hand is open or closed, the system including a sensing mechanism operatively coupled to a computing device, the system comprising:
   a skeletal recognition engine for recognizing at least a portion of a skeleton of a user from received data including at least one of image and depth data;
   an image segmentation engine for analyzing depth data received from the skeletal recognition engine to segment one or more regions of the body into a region representing a hand of the user; and
   a descriptor extraction engine for extracting data representative of a hand including one or more fingers and whether the hand is open or closed, the descriptor extraction engine applying a plurality of filters for analyzing pixels in the region representing the hand, each filter in the plurality of filters determining a position and open or closed state of the hand, the descriptor extraction engine combining the results of each filter to arrive at a best estimate of whether the hand is opened or closed.

10. The system of claim 9, wherein the plurality of filters of the descriptor extraction engine include a discontinuity filter measuring contour discontinuities around a shape assumed to be a hand, the discontinuity filter identifying a closed hand when the contour discontinuities are below a predetermined threshold.

11. The system of claim 9, wherein the plurality of filters of the descriptor extraction engine include a natural grab filter detecting movement of a hand toward the sensing mechanism and whether fingers of the hand are open or closed.

12. The system of claim 11, wherein the natural grab filter determines whether fingers of the hand are open or closed in part by identifying pixels of a hand which are farthest from a point of the skeleton identified as an elbow in the same arm as the hand.

13. The system of claim 9, wherein the plurality of filters of the descriptor extraction engine further include one or more sub-filters to determine whether fingers of the hand are open or closed, a first sub-filter of the one or more sub-filters is a circle sub-filter determining whether a silhouette of the hand approximates a circle, the circle sub-filter indicating the hand is closed if the silhouette approximates a circle.

14. The system of claim 13, wherein the circle sub-filter identifies a center of a mass estimated to be the hand and determining a standard deviation between the center of mass and the pixels identified as being farthest from the elbow.

15. The system of claim 13, wherein a second sub-filter of the one or more sub-filters measures depth jumps and estimates that the hand is closed if the number of depth jumps is below some predetermined value.

16. The system of claim 14, wherein a third sub-filter of the one or more sub-filters is a paddle sub-filter determining whether a hand includes fingers which are extended and together, the paddle sub-filter using a histogram to classify fingertip pixels into bins, and examining the number of pixels in each bins using known models of open and closed hands to estimate whether the hand is opened or closed.

17. The system of claim 16, wherein a result and confidence for each of the one or more sub-filters are combined to determine whether a hand is opened or closed.

* * * * *